United States Patent [19]

Hilbrink

[11] 4,112,415

[45] Sep. 5, 1978

[54] SYSTEM FOR OPTICALLY ENTERING, DISPLAYING AND DECODING HANDWRITTEN SYMBOLS

[76] Inventor: Johan O. Hilbrink, 4002 Sharon Park Lane 24, Sharonville, Ohio 45241

[21] Appl. No.: 744,124

[22] Filed: Nov. 22, 1976

Related U.S. Application Data

[63] Continuation-in-part of Ser. No. 635,884, Nov. 28, 1975, abandoned.

[51] Int. Cl.² .......................... G06F 3/02; G06K 9/00
[52] U.S. Cl. ................. 340/146.3 SY; 340/146.3 AE; 364/900
[58] Field of Search ............... 340/146.3 SY, 146.3 H, 340/146.3 AE, 146.3 MA, 146.3 Q; 364/200 MS File

[56] References Cited

U.S. PATENT DOCUMENTS

| | | | |
|---|---|---|---|
| 3,399,401 | 8/1968 | Ellis et al. ............................... | 445/1 |
| 3,487,371 | 12/1969 | Frank ...................... | 340/146.3 SY |
| 3,551,896 | 12/1970 | Baskin et al. ...................... | 340/172.5 |
| 3,723,970 | 3/1973 | Stoller ...................... | 340/146.3 MA |
| 3,760,373 | 9/1973 | Bartz ...................... | 340/172.5 |
| 3,761,877 | 9/1973 | Fernald ...................... | 340/146.3 SY |
| 3,846,752 | 11/1974 | Nakano et al. ............... | 340/146.3 Q |

*Primary Examiner*—Joseph M. Thesz
*Attorney, Agent, or Firm*—Melville, Strasser, Foster & Hoffman

[57] ABSTRACT

An optical data entry and display system for decoding handwritten symbols into a data processing code is disclosed. The system comprises a television monitor for displaying decoded and otherwise derived symbols as well as for displaying a sequence of light spots on which a symbol may be traced by means of a light pen. The positions of the light spots comprising the trace are used in a comparison with a set of stored values defining the predetermined symbols to decode the trace.

20 Claims, 12 Drawing Figures

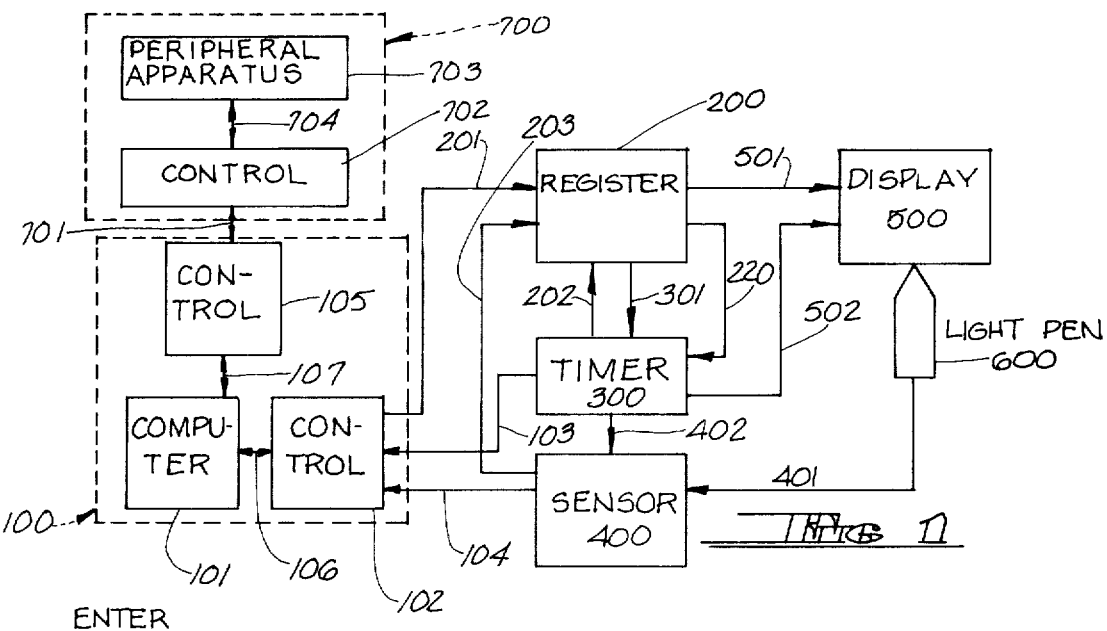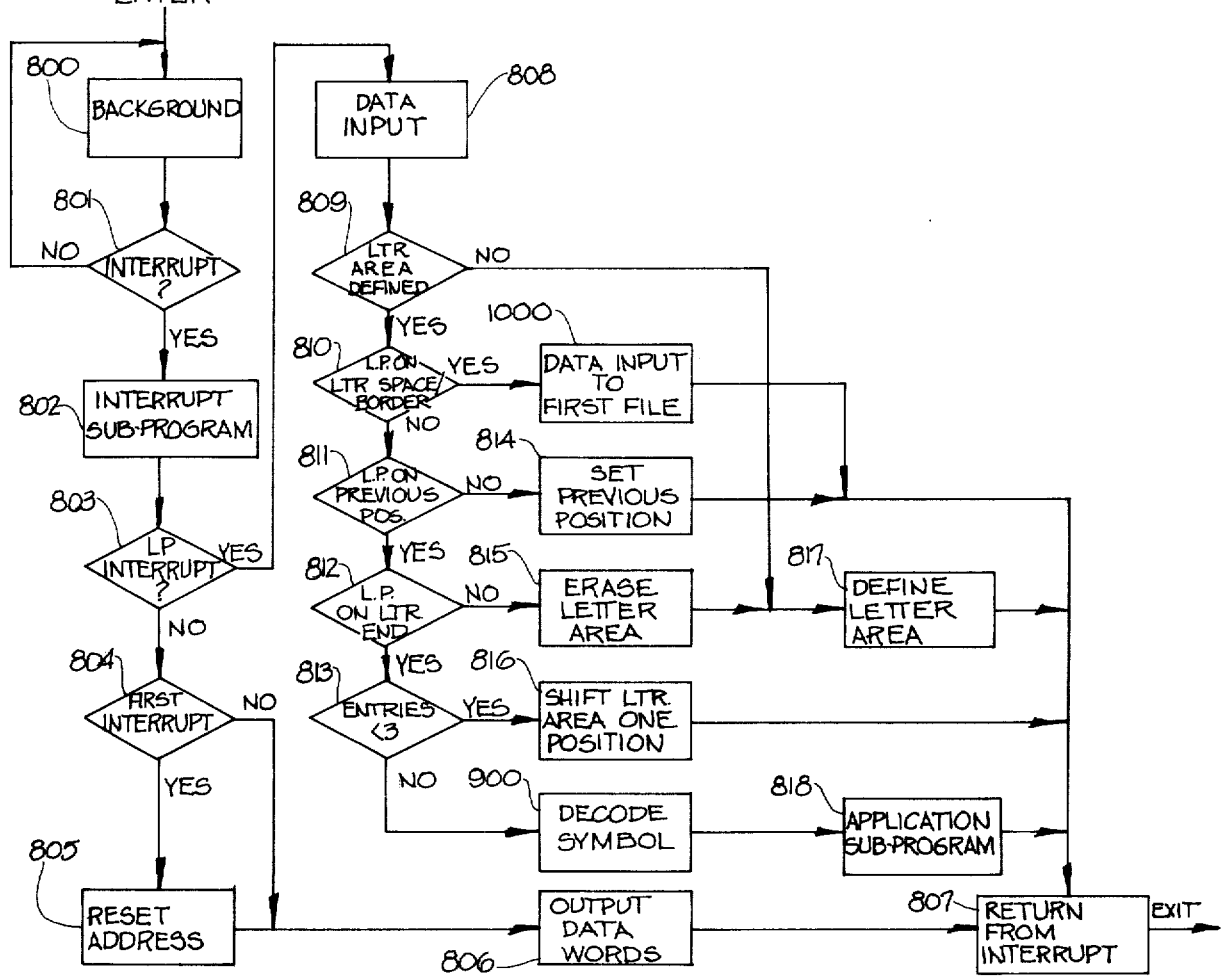

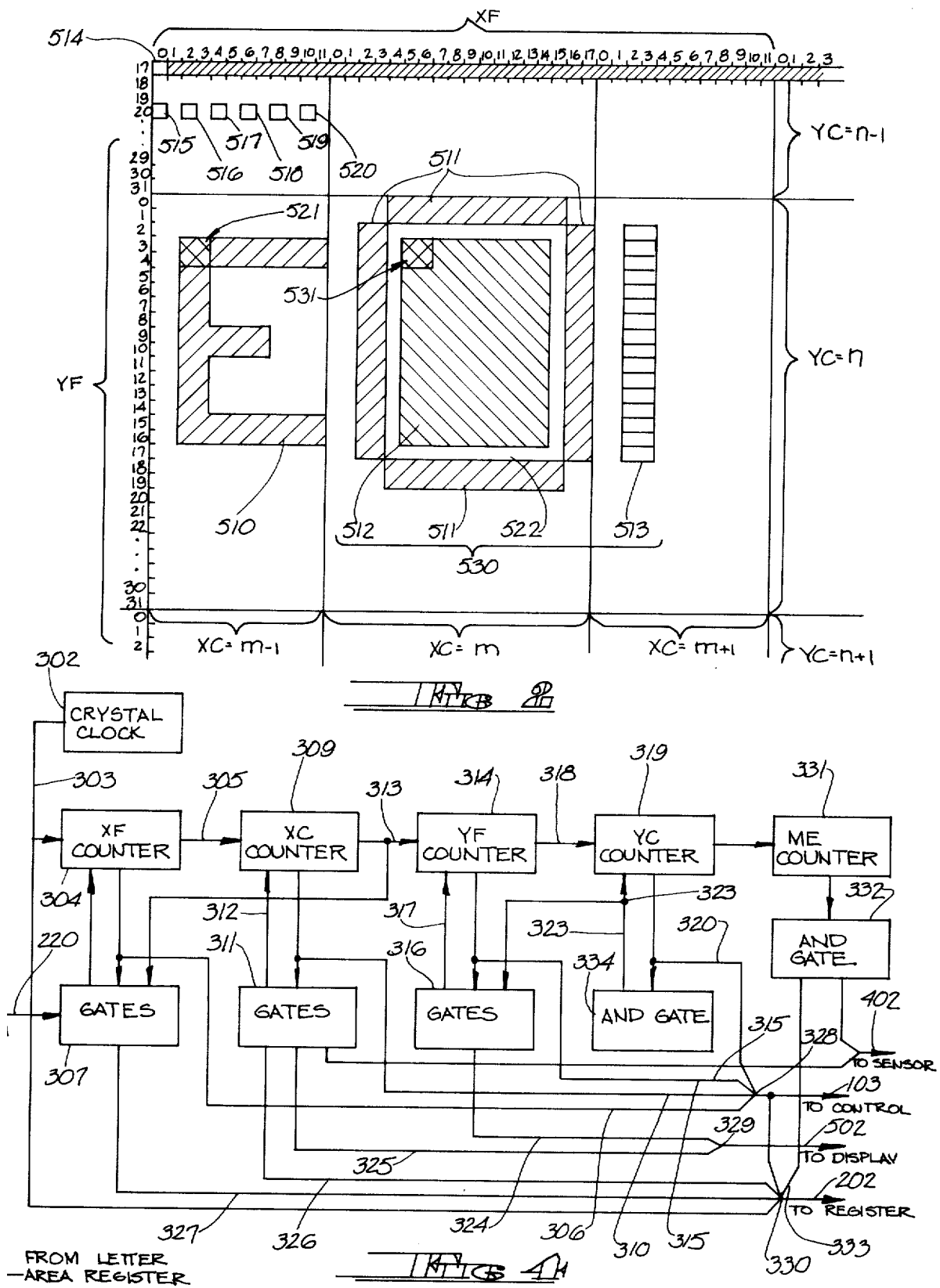

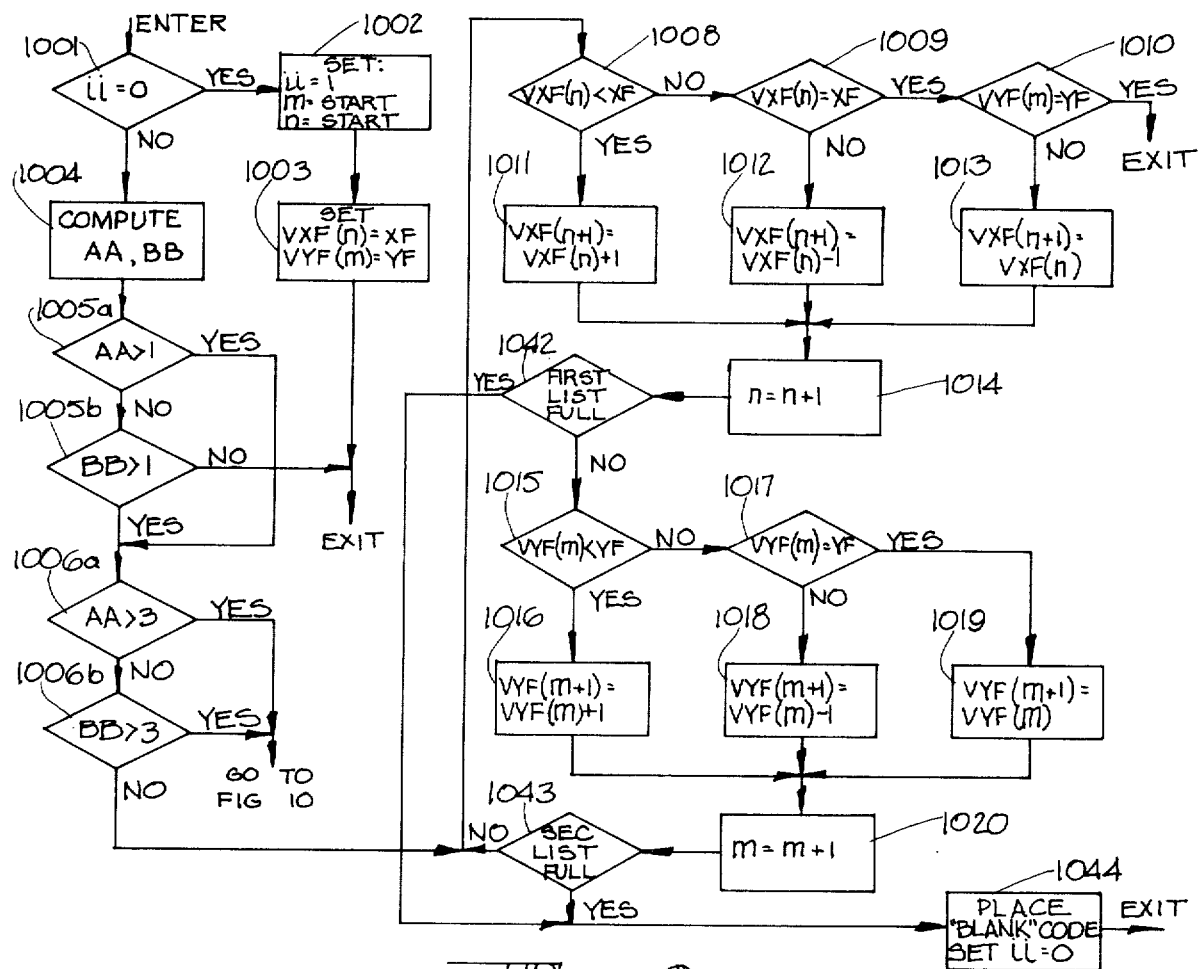
FIG. 4
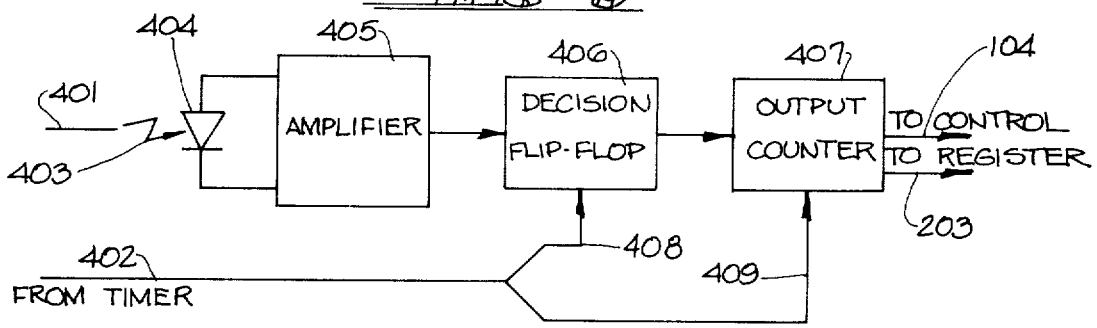
FIG. 5
FIG. 7

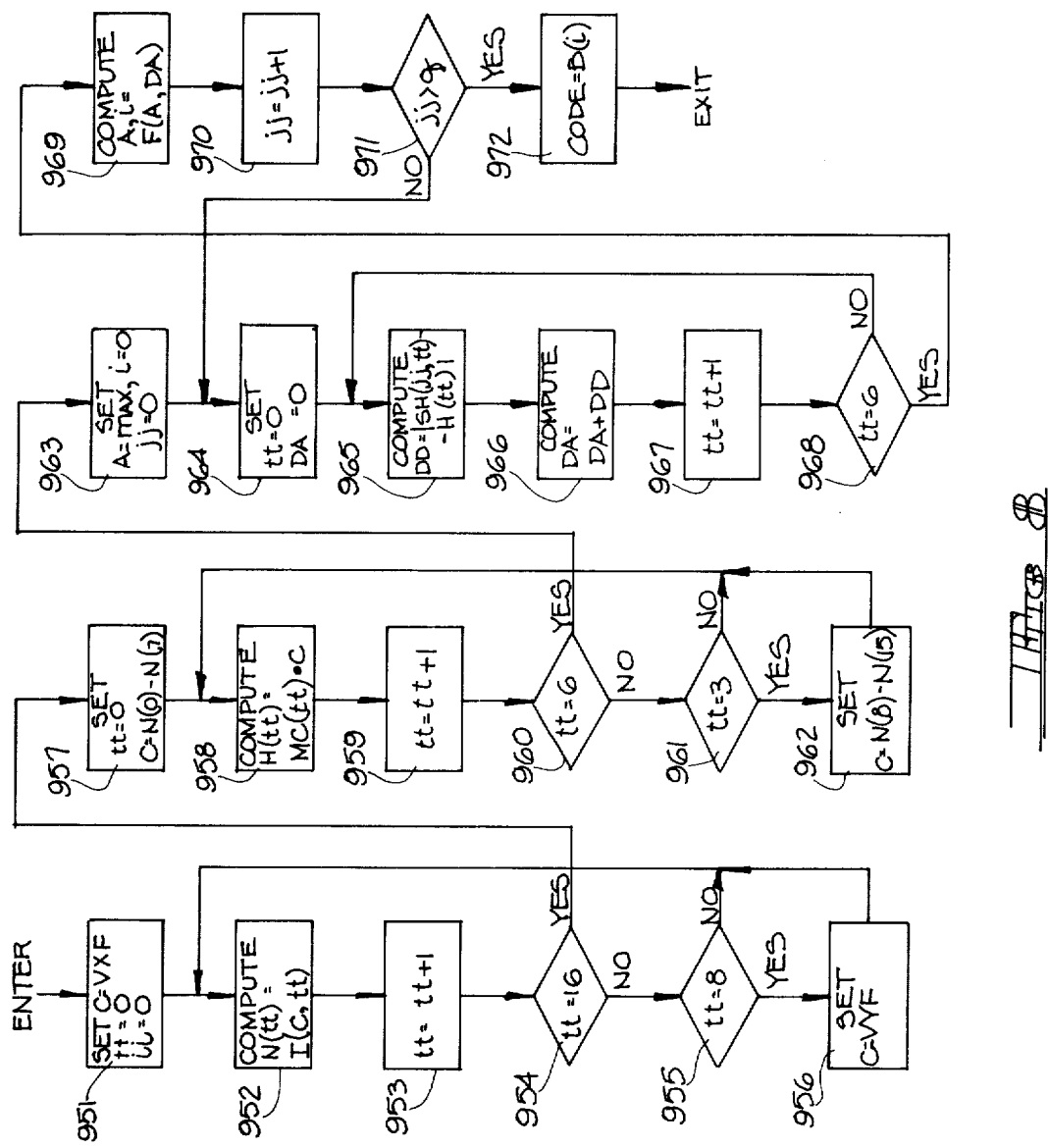

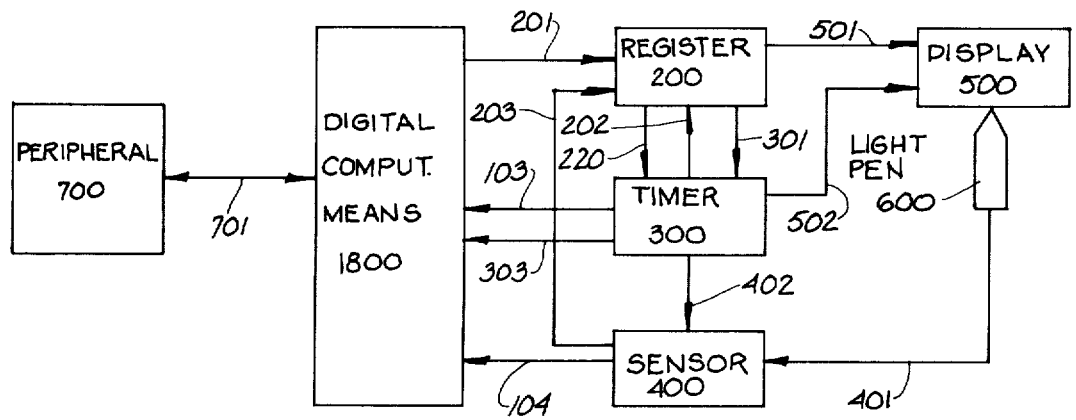

SYSTEM FOR OPTICALLY ENTERING, DISPLAYING AND DECODING HANDWRITTEN SYMBOLS

CROSS REFERENCE TO RELATED APPLICATION

This is a continuation-in-part of the copending application of the same inventor, Serial No. 635,884, filed Nov. 28, 1975 now abandoned, and entitled SYSTEM FOR OPTICALLY ENTERING, DISPLAYING AND DECODING HANDWRITTEN SYMBOLS.

BACKGROUND OF THE INVENTION

The present invention relates in general to the field of data processing and data communication systems and more specifically to man-machine apparatus in these systems.

The field of data processing has experienced rapid growth. A particularly active area in this field is equipment for use by an operator to interact with these data processing systems. Equipment of this type functions in the man-machine interface and includes, for example, tele-typewriters, keyboard-CRT's and cardpunch apparatus. The present invention is an entirely novel means to perform the man-machine interface function.

The present invention requires on the part of man no more than ordinary writing skills, that is, man writes with a pen on the face of a display and a programmed processor decodes the writing into any code commonly used in data processing systems.

The set of symbols to be used includes alpha-numeric characters as well as non-alpha-numeric symbols such as punctuation signs and control signs. The symbols are those presently in common use, but may also include symbols not commonly known, for example for use in control functions.

Input verification is a required function in the man-machine interface. In the present invention verification is facilitated by the display of the decoded symbol in the position where the writing took place. Analogous to the manner in which man writing with a pencil on paper will automatically review his writing, in the present invention input verification is near automatic.

Current man-machine data entry apparatus are, in part, mechanical. An apparatus in accordance with the present invention is all electronic. The electronic components used are the same or substantially similar to the components used in data processing or calculating equipments. The many advances in the technology of these components, which are continuously being made, are directly applicable to the present invention for improvements in use, reliability and economy. By the way of example, for reason of reducing the bulk of current data terminals and television sets, much attention is given to flat panel displays. This advance will allow implementation of this invention in a manner of near complete analogy with notepad and pencil.

The present invention implemented with the same general physical dimensions as a notepad will greatly enhance the use of a man-machine interface. Through standard telephone communication connections, the sophisticated software of central data processing systems becomes available with ease.

Many prior art systems have attempted to take advantage of man's manual dexterity in the manipulation of a stylus to effect the input of data into data processing or data communication systems. Exemplary of one type of such system is U.S. Pat. No. 3,487,371 issued to Frank. This patent teaches a system in which a stylus is mechanically linked to a position determining means with display effected separate and displaced from the position of writing. Writing with the stylus causes the display to show a decoded symbol. Inability of this system to display the trace of the stylus while writing and the display of the decoded symbol in the place of writing, as well as, the electronic complexity severely hampers the use of this system.

Other systems employing an optically sensitive stylus, commonly known as a lightpen, effect data input by pointing the lightpen at a desired symbol or at a plurality of segments constructing a symbol. Exemplary of such apparatus are U.S. Pat. No. 3,768,073 issued to Rawson and U.S. Pat. No. 3,760,373 issued to Bartz. Both apparatus employ light emitting diodes located in a limited matrix of positions for display. This limited matrix of light point positions severely limits the flexibility and ease of use for data input and writing.

Other systems employing a lightpen and a cathode ray tube display are primarily intended for the input of a graphic data, and the manipulation, with the assistance of computer software, of the graphics. Exemplary of these systems are U.S. Pat. No. 3,534,338 issued to Christensen et al. and U.S. Pat. No. 3,653,001 issued to Ninke. In these systems a small on-site computer performs routine and less sophisticated tasks, such as for example tracking the lightpen, while a central computer is used to perform tasks requiring extensive software. The appeal of these systems is limited by their inability to interpret the graphics.

Other graphics systems are designed to transmit handwritten data or drawings as a facsimile. Exemplary of these systems is U.S. Pat. No. 3,559,182 issued to Floret et al. This system effects the transmission of a handwritten trace to a plurality of television sets, thus providing a message transmission capacity. The message however can only be understood if the receiver is a human capable of reading the writing, an obvious limitation in the usefulness of this system.

Accordingly it is an object of the present invention to provide a man-machine interface apparatus capable of communicating with a remote data processing facility in a data processing code.

It is a further object of the present invention to provide the capacity to interpret and decode handwritten "graphic" data into a data processing code.

It is a further object of the present invention to achieve decoding of handwritten graphics with economical electronic components.

It is a further object of the present invention to provide a data input means with a pen writing the desired data.

It is a further object of the present invention, for ease of use and verification, to provide display of the writing and the decoded symbol where the writing takes place.

SUMMARY OF THE INVENTION

In accordance with these and other useful objects, the present invention discloses an optical data entry and display system for decoding handwritten symbols into a machine code defined by a set of predetermined symbols.

The system includes a television monitor or the like which is interfaced to a digital computing means by a timing circuit and a plurality of registers. Under instruction of the computing means, the plurality of registers, in association with the timing circuit, causes the television monitor to display a defined sequence of display elements or light spots. The position of each of the display elements or light spots is uniquely defined by a particular state of the timing circuit.

A light pen is used to enter a desired symbol by tracing the symbol on the defined sequence of display elements. The light pen, which is sensitive to light emitted from the display elements, activates a sensing circuit each time a light hit is detected. The sensing circuit, in turn, addresses the plurality of registers so as to cause the display element corresponding to the detected light hit to change state whereby visual verification of the traced symbol is achieved. In addition, upon the detection of a light hit, the sensing circuit causes the computing means to sample the output of the timing circuit whose state defines the position of the light hit.

The computing means compares the data representing light hit positions for a traced symbol with stored data uniquely defining each of the predetermined symbols. This comparison is facilitated by means of a Fourier analysis performed on the light hit positions. Finally, the best comparison defines the traced symbol as a particular symbol from the set of predetermined symbols. That is, the comparison decodes the traced handwritten symbol into a data processing code defined by a particular symbol from the set of predetermined symbols.

The data processing code may subsequently be presented to a character generator which provides video signals to the display for showing the decoded symbol.

BRIEF DESCRIPTION OF THE DRAWINGS

FIG. 1 is a general block diagram showing the major functional hardware elements of the preferred embodiment of the present invention.

FIG. 2 is a detailed representation of the manner of display employed in the present invention.

FIG. 4 is a detailed block diagram of the timer shown generally in FIG. 1.

FIG. 5 is a detailed block diagram of the sensor shown generally in FIG. 1.

FIG. 6 is a general flow chart illustrating the major functional software modules useful in practicing the present invention.

FIG. 7 shows the relative values of a series of data points and illustrates a group of interpolated values for the series.

FIG. 8 is a flow chart showing the program for implementing the improved decoding algorithm of the present invention.

FIG. 9 is a first section of a flow chart showing a program for decoding input data useful in practicing the present invention.

FIG. 11 is a general block diagram showing the major functional hardware of another preferred embodiment of the present invention.

DETAILED DESCRIPTION OF THE PREFERRED EMBODIMENTS

Figure 3:
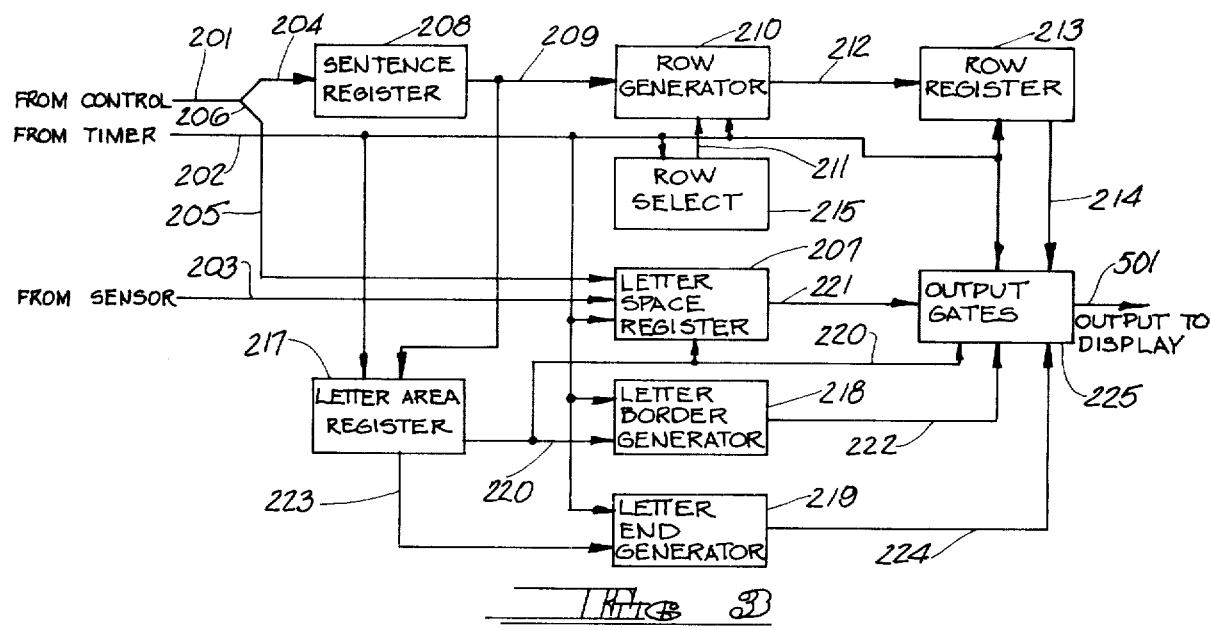
FIG. 3 is a detailed block diagram of the register shown generally in FIG. 1.

The apparatus and methods of the present invention are useful in any of a number of computer based data entry and/or data display systems. Although the decoding and display systems of the present invention are disclosed in terms of a preferred embodiment, this has been done for purposes of an exemplary showing and it will be understood by one skilled in the art that the means described are for purposes of example only, and are not intended to be limiting.

FIG. 1 is a diagrammatic illustration showing the major functional hardware elements of the preferred embodiment of the present invention. In particular, the basic decoding and display functions of the present invention are controlled by a computing means shown generally at 100. The computing means 100 includes a general purpose programmable digital computer 101 and control circuits 102 and 105. Interfacing connections between the digital computer 101 and the control circuits 102 and 105 are generally shown at 106 and 107 respectively. The control circuit 102 serves to interface the digital computer 101 to a register 200 via line 201, to a timing circuit 300 via line 103, and to a sensing circuit 400 via line 104. Similarly, the control circuit 105 serves to interface the digital computer 101, via line 701, to a bank of peripheral equipment shown generally at 700. The peripheral equipment 700 may typically include an interface control circuit 702 and any of a number of well-known peripheral apparatus diagrammatically shown at 703. The control circuit 702 and the peripheral apparatus 703 communicate by means of connection 704. In the foregoing and following discussions, it will be understood by one skilled in the art that a connection identified in the figures by a single line may, in fact, comprise a plurality of individual connecting means each of which may conduct one or a sequential series of data elements or signals. By way of example, in the preferred embodiment of the present invention line 201 includes nine wires, six wires conducting six parallel information data elements and the remaining three wires conducting various control signals.

The basic function of register 200 is the generation of video signals for application to the display 500 overline 501. The display 500, in response to the video signals on line 501 as well as timing signals on line 502 from timer 300, generates a unique image on the face of the display 500. This unique image, which consists of a plurality of individual image elements, will be discussed in further detail hereinafter.

A lightpen 600, which is capable of detecting light within its field of view in a manner well-known in the art, is utilized to detect the presence of an image element on the face of the display 500. The detected light will be transmitted over line 401 to a sensor 400 which, upon determining that a light hit has occurred, will output control signals to the computing means 100 and the register 200 over lines 104 and 203 respectively. The output on line 104 will cause the control circuit 102 to read from the timer 300 two binary words, referred to hereinafter as the first binary word and the second binary word, defining the position of the lightpen 600 on the face of the display 500. The control circuit 102 will then interact with the interrupt hardware and program of the digital computer 101 so as to cause the computer 101 to store the first and second binary words in its memory.

Simultaneously, the output on line 203 from the sensor 400 will cause the register 200 to reflect the position of the lightpen 600 by causing a first change in the video output on line 501, whereby the image element corresponding to the position of lightpen 600 will undergo a change of state from light to dark. This change of state will then provide visual feedback regarding the position of the lightpen 600. By retaining a sequence of such first changes, the register 200 will cause the display 500 to provide visual verification of the trace of the lightpen 600 on the face of the display as the operator traces out a symbol.

In addition, certain of the first and second binary words will cause the computer 101 to detect a first reset condition. Upon the detection of this first reset condition, the computer 101 will cause the control circuit 102 to generate a first reset signal. The first reset signal will be applied over line 201 causing the erasure of the first changes in the register 200 and thereby erasing the lightpen trace.

The timer 300 is utilized to generate the various synchronizing signals necessary to make the computing means 100, the register 200, and the display 500 operate in unison. In this regard, synchronizing signals are applied from the timer 300 to the otherwise free running display 500 over line 502. Register 200 receives timing signals over line 202 which provides for the performance of register shift operations so as to enable the presentation of video information on line 501 in synchronization with the synchronizing signals applied to the display 500 over line 502. Also, by means of connection 402, the timer 300 applies a measurement enable signal to the sensor 400 to enable its circuitry at appropriate times.

In the preferred embodiment of the present invention the register 200 has a capacity to store data for the display of one sentence of 32 symbols, i.e., one row of symbols on the face of the display 500. Therefore, after one sentence of symbols has been displayed on the display 500, the timer 300 must request from the computer 101 the information for the next sentence. This request is made by means of a signal on line 103. The computer 101 when outputs data for the next sentence to the register 200 over line 201 in such a manner that the output is completed before timer 300 causes the register 200 to initiate its video output on line 501 for the next sentence.

As previously mentioned, a computing means 100 interfaces with a bank of computer peripheral equipment 700, by means of line 701. Although various computer peripheral equipment are currently available and within the scope of the present invention, the preferred embodiment described herein contemplates the use of a teletypewriter with a keyboard, a printer, a papertape reader and a papertape punch. Also, the preferred embodiment contemplates the use of a modulator/-demodulator system (MODEM) for interfacing the computing means 100 to one or more data communication facilities. Finally, the preferred embodiment also contemplates the use of peripheral equipment for connecting the computing means 100 directly to a data processing facility.

Because of their unique functions in connection with the system of the present invention the display 500, the lightpen 600, and the controlling circuits including the register 200, the timer 300 and the sensor 400, have been singled out for separate presentation and discussion hereinafter. However, before undertaking a detailed discussion of the aforementioned hardware, it is considered useful to initially examine the characteristics of the visual display produced on the face of the display 500.

With regard to the display 500 itself, this may comprise a modified television set whose mode of operation closely resembles the operation of a typical television set. That is, an electronically modulated beam of electrons is caused to sweep across the face of the display causing the coating material of the display face to either emit light or to remain non-illuminated, depending upon the modulation of the beam of electrons. For example, display 500 may typically comprise a Ball Brothers Research Corporation Model TV-5-STD data display.

An example of the function of the present invention is given hereinafter in connection with FIG. 6. An appreciation of one detailed functional objective of this invention and its manner of attainment is considered helpful in understanding the constituent elements of the invention, even though presentation of the example must be deferred until a presentation of the constituent elements has been made. For this reason, this example is referenced for information now.

As previously mentioned, register 200 has the capacity to store data for the display of one sentence of 32 symbols on the face of display 500. Each of the symbols will be displayed in accordance with the general organization shown in FIG. 2. FIG. 2 shows in part, the letter E 510 and adjacent thereto a letterarea 530 comprising a letterborder 511, a letterspace 512 and a letterend 513. In addition, FIG. 2 shows a series of coordinates XC, XF, YC and YF which uniquely identify each video element capable of being displayed on the face of display 500. The coordinates XC, XF, YC and YF are generated by a series of counters included within timer 300, which will be described in further detail hereinafter. In general terms, the counters include an X-coordinate Coarse counter XC, an X-coordinate Fine counter XF, a Y-coordinate Coarse counter YC, and a Y-coordinate Fine counter YF.

This function of display 500 will be explained in connection with the coordinates XC, XF, YC and YF, where it is understood that these coordinates are representations for the states of the coordinate counters XC, XF, YC and YF, respectively. By way of example, coordinates XF 0 in FIG. 2 represents a state called 0 of the XF counter.

Referring again to FIG. 2, a beam of electrons is caused to sweep across the face of display 500 such that the beam will enter at the position identified by 514. Position 514 identifies a point on the face of display 500 with coordinates $YF = 17$, $XF = 0$, $XC = M-1$, and $YC = N-1$. The beam will then continue for increasing XF and XC, while YF and YC remain constant. When XF and XC have reached the position identified by $XC = 32$ and $XF = 11$, the timer 300 will cause the beam of electrons to be modulated off. The state $XC = 32$ and $XF = 11$ will cause the next state of YF, in this example $YF = 18$. As shown in FIG. 2, the beam of electrons is modulated off during $YF = 18$ and $YF = 19$.

It will be appreciated that the smallest increment at which the electronic controls are capable of modulating the electron beam on and off correspond to the duration of one stae of counter XF. Therefore, the fastest rate of turning the electron beam on and then off is diagrammatically represented by positions 515 through 520. Each position 515 through 520 represents a lightspot corresponding to counter state $YC = N-1$, $YF = 0$, $XC = M-1$ and $XF = 0, 2, 4, 6, 8$ and 10.

The generation of symbols such as alphanumeric characters in a matrix of lightspots consisting of five horizontal positions and seven vertical positions in a technique well known in the art. The letter E 510 is drawn on such a 5×7 matrix. This 5×7 matrix corresponds to the letterspace 512 of letterarea 530. Blocks 521 and 531 are diagrammatic representations of corresponding lightspots in the 5×7 matrix. By appropriately modulating the beam of electrons the letter E 510 as well as the letterarea 530 can be made to appear to the face of display 500. Thus, it is clear that each of the images 510, 511, 512 and 513 can be achieved by appropriately modulating the electron beam during a plurality of unique states of counters, XF, XC, YF and YC.

As detailed above, the position of lightpen 600 on the face of display 500 can be determined from the lightspot uniquely identified by a particular set of XF, XC, YF and YC values. In this connection, the previously mentioned first and second binary words will contain the values of the coordinates XC, XF and YF. The first binary word includes the values for XF and XC, while the second binary word includes the values for XC and YF. It will therefore be apparent that the character position in a particular sentence can be identified by either the first or second binary word, whereas the unique identification of a lightspot position requires information from both binary words.

As will be discussed in further detail hereinafter, register 200 includes a letterspace register which contains the requisite information for modulating the electron beam so as to cause the letterspace 512 to be displayed. The initial information stored in the letterspace register will cause all letterspace display elements to be "on", i.e., illuminated. When an operator writes on the letterspace 512 with the lightpen 600 positioned over a particular letterspace display element, the sensor 400 detects the light emitted thereby and causes a change in the information stored in the letterspace register. This change will result in the particular letterspace display element being extinguished, i.e., non-illuminated, giving the operator a visual feedback of his writing. The changes in information content of the letterspace register are retained until the computer 101 causes the first reset signal to be generated whereupon the information in the letterspace register will be returned to its initial or "on" condition.

It will be clear from an inspection of FIG. 2 that many detail design variations can be made in the letterarea 530. For example, the sections of the letterborder 511 can be made to overlap or, in the alternative, they can be designed to only partially enclose the letterspace 512. It is also possible to replace any section of the letterborder 511 with the letterend 513 as well as to extend the lighted area of letterborder 511 to meet letterspace 512 on any or all sides of letterspace 512. These and other variations can be implemented by those skilled in the art of logic design by an appropriate design of the gating networks in the timer 300.

FIG. 3 is a detailed representation of register 200. As generally shown in FIG. 1, line 201 connects the register 200 to the output of the control circuit 102; line 203 connects the register 200 to the output of the sensor 400; line 202 connects the register 200 to the output of the timer 300; and line 501 connects the register 200 to the input of the display 500.

The register 200 includes a sentence register 208 typically comprising a shift register integrated circuit model TM 3112 Hex 32 Bit Static Shift Register manufactured by Texas Instruments, Inc. In response to inputs from the control circuit 102 on lines 201 and 204, the sentence register 208 can be filled with an ordered sequence of thirty-two, six-bit codes. Each of the six-bit codes may represent a symbol in accordance with the U.S.A. Standard Code for Information Interchange USASCII by eliminating the seventh code bit. After being placed in the sentence register 208, the ordered sequence of thirty-two, six-bit codes can be shifted by clock signals derived from the timer 300 over line 202 to present on output line 209 the ordered sequence of codes. The ordered code sequence can be presented on output line 209 repeatedly.

The output 209 of the sentence register 208 connects to a row generator 210. Row generator 210 may typically comprise a Model TM 2501, 2560 Bit Static Read-Only Memory manufactured by Texas Instruments, Inc. The characteristics of row genertor 210 are such that under conditions of six inputs on line 209 and three inputs on line 211, five outputs can be achieved on output line 212. The five outputs on line 212 represents in binary form one row of seven rows of a 5×7 binary matrix. This 5×7 binary matrix corresponds to the letterspace 512 shown in FIG. 2. By appropriately pulsing the three inputs represented by line 211, all of the seven rows can be output on line 22 sequentially. It will be clear that by changing the input code on line 209, and the inputs on line 211, all symbols defined for the row generator 210 can be caused to appear on line 212 sequentially. Furthermore, by sequentially outputting codes on line 209, while maintaining the three inputs of line 211 in the same state, the same row of all thirty-two symbols contained in sentence register 208 can be caused to appear on output line 212.

Output line 212 of the row generator 210 connects to the input of a row register 213. Row register 213 is designed to accept the five outputs on line 212 from row generator 210 and to subsequently shift out five corresponding information bits on output line 214. The shifting action of row register 213 is controlled by appropriate clock pulses derived from the timer 300 over line 202.

A row select circuit interfaces with the row generator 210 and controls the state of the three inputs to row generator appearing on line 211. Row select 215 is designed to sequence the three inputs on line 211 in a manner such that a first row of all symbols contained in sentence register 208 will appear on output line 212, followed by a second row, etc. Appropriate clock pulses for row select 215 are derived from the timer 300 over line 202.

It will be recognized that the combined operation of sentence register 208, row generator 210, row select 215 and row register 213 will enable the display of symbols on display 500 such as the letter E shown in FIG. 2. Accordingly, any defined symbol may be displayed on the face of display 500 by means of the aforementiond circuitry.

The generation of the letterarea 530 is accomplished by means of the letterspace register 207, the letterborder generator 218, the letterend generator 219 and the letterarea register 217. One unique six-bit code is designated to represent the letterarea 530. When this unique six-bit code appears on line 209 it will be detected by the letterarea register 217. The letterarea register 217, in turn, activates the letterspace register 207, the letterborder generator 218 and the letterend generator 219 through connection 220 and 223. However, since an inherent delay in the circuitry of row generator 210 causes its output on line 212 to appear later than the coresponding input on line 209, the letterarea register 217 must delay the inputs to the letterspace register 207, the letterborder generator 218 and the letterend generator 219 so as to provide synchronization between the outputs appearing on line 212 and lines 221, 222 and 224.

As previously discussed in connection with FIG. 2, every display element of letterborder 511 is uniquely defined by an XF coordinate, represented by the state of an XF counter, and a YF coordinate, represented by the state of a YF counter. The letterborder generator 218 comprises a network of logic gates adapted to generate on output line 222 the signals which will cause display 500 to display the letterborder 511. It will be appreciated by one skilled in the art that the logic network of letterborder generator 218 will implement a logical sum of products operation, in which each product of the form XF "logical and" YF represents a letterborder display element, and in which the sum is the sum of products of all letterborder elements.

The letterspace register 207 includes a register stage for every display element in letterspace 512. The letterspace register 207 is shifted, in response to clock signals appearing on line 202, to sequentially output on line 221 the modulation information contained therein. When lightpen 600 is positioned over letterspace 512 and sensor 400 detects the presence of light, the stage in letterspace register 207 containing the modulation information for that lightspot will change state. In this manner, all "hits" detected by sensor 400 are recorded in the corresponding stage of the letterspace register 207 whereby the modulation information appearing on line 221 will reflect the sequence of detected "hits" and consequently show the trace of lightpen 600. The letterspace register 207 will retain the modulation information indicative of the trace until the first reset signal on line 205 causes the letterspace register 207 to reset to its initial "no trace" condition. For those skilled in the art of logic design the methods of analysis and design for a register that meets the requirement of letterspace register 207 are well known.

As in the case with the letterborder 511, the letterend 513 as depicted in FIG. 2 comprises a series of display elements each uniquely defined by the state of counter XF and the state of counter YF. Therefore, the letterend generator 219 can be reduced by one skilled in the art to a logic network implementing a logical sum of products representing all display elements of the letterend 512. When enabled, letterend generator 219 will then generate an output on line 224 the signals which will cause display 500 to display the letterend 513.

The output gates 225 merge the information signals appearing on line 214 and 221, 222, 224 to provide a composite video output for the display 500 on line 510. The composite video signals appearing on line 501 are then utilized, in conjunction with synchronizing signals appearing on line 502, by the display 500 to generate the visual image. It will be recognized that the output gates 225 are responsive to control signals appearing on line 220 which indicates the presence/absence of a letterarea code on line 209. In addition, the output gates 225 receive synchronizing signals from the timer 300 over line 202. Finally, and as will be described in further detail hereinafter, measurement enable video signals are applied to the output gates 225 from the timer 300 over line 202. The design of a network of logic gates which meet the requirements for output gates 225 is well known to those skilled in the art of logic design.

The timer 300 shown generally in FIG. 1 is shown in further detail in FIG. 4. It will therein be noted that line 103 connecting to the control circuit 102 comprises lines 306, 310, 315 and 320 merging at juncture 328; that line 502 connecting to the display 500 comprises line 324 and 325 merging at juncture 329; and that line 202 connecting to register 200 comprises lines 103, 326, 327, 303 and 333 merging at juncture 330.

The timer 300 derives its basic timing signals from a crystal clock generator 302. The square wave clock signal output from the crystal clock 302 appears on line 303 and, in the preferred embodiment, has a clock pulse period of approximately 0.1357 microseconds. Also included in the timer 300 is the XF counter 304, the XC counter 309, the YF counter 314, and the YC counter 319. One of a series of network gates 307, 311, 316 and 334 is associated with each of the counters. The counters 304, 309, 314 and 319 may typically comprise binary counting integrated circuits of the type manufactured by Texas Instruments, Inc. as SN 74163.

One function of timer 300 is generation of the synchronizing and timing signals required by the display 500. A typical display of the type contemplated by display 500 may require a vertical blanking pulse having a nominal duration of 900 microseconds, a horizontal blanking pulse having a nominal duration of 11 microseconds, a vertical drive pulse having a duration between 300 and 1400 microseconds, and a horizontal drive pulse having a duration of 25 to 30 microseconds. In addition, the duration of a video line across the face of the display 500, the line time, may typically be 63.5 microseconds. Another timing requirement is the symbol time which may be defined as the time required by the electron beam to sweep across the width of a symbol. In the preferred embodiment, the symbol time has been set at twelve clock pulse periods. Therefore, the requirement for horizontal blanking can be fulfilled by counting seven symbol times. And, since the display of 32 symbols in a sentence requires 32 symbol times, the sum of the horizontal blanking and 32 symbol times fulfills the line time requirement of 63.5 microseconds. Finally, the horizontal drive time may be derived from the horizontal blanking plus ten symbol times.

In order to meet the timing requirements set forth above, the XC counter 309 must count to seven (for horizontal blanking) and to thirty-two (one sentence). Block 311 comprises a network of logic gates adapted to detect the terminal counts, seven and 32, of XC counter 309 to appropriately reset the counter.

The time required for the beam of electrons to sweep across the letterarea 530, the letterarea time, is eighteen clock pulse periods. Since a sentence containing the letterarea would exceed the line time, 63.5 microseconds, in the preferred embodiment the time for the last symbol in a sentence is shortened by an amount equal to the difference between a symbol time (twelve clock pulse periods) and a letterarea time (eighteen clock pulse periods). Thus, the XF counter 304 is required to count to twelve, eighteen and six (the difference between twelve and eighteen). Gates 307 comprise a network of logic gates adapted to detect the terminal counts of and reset the XF counter 304.

As will be noted upon examination of FIG. 2, in the present preferred embodiment, 32 video lines are used to display one sentence including one space between sentences. Also, the vertical blanking time can be derived by counting fourteen lines which can also be used to fulfill the vertical drive time requirement. Accordingly, the YF counter 314 must count to 32 and 14. Gates 316 comprise a network of logic gates adapted to detect the terminal counts of and to reset the YF counter 314 accordingly.

The display 500 must be capable of displaying a member of sentences, typically eight. Accordingly, the YC counter 319 must count to eight. The terminal state of the YC counter 319 is detected by AND gate 334 whose output appears on line 323 and is used to reset the YC counter 319 and to indicate to gates 316 that the vertical blanking pulse must be generated.

Finally, the characteristics of the cathode ray tube of the display 500, the optic fiber in lightpen 600 and the sensor 400 are such that in order to determine the position of lightpen 600 the lightpen trace must be momentarily erased. This momentary erasure rendering all display elements in letterspace 512 "on" or illuminated, is controlled by the measurement enable counter diagrammatically represented by block 331. The measurement enable counter 331 counts display frames, and may typically comprise a two stage binary counter. The AND gate diagrammatically represented by block 332 decodes one of the four states of the two stage binary counter 331 and enables display of the trace during this state. During the remaining three states of the two stage binary counter 331 the trace is not enabled whereby measurement of the lightpen position may be accomplished. The output 402 of AND gate 332 is used to enable the sensor 400. The output 333 from AND gate 332 appears on line 202 and is applied to output gates 225, see FIG. 3, to erase the lightpen trace three out of every four frames.

FIG. 5 shows the circuit for the sensor 400. The optic fiber 401 optically connects the lightpen 600 to a photodiode 404 as diagrammatically illustrated by arrow 403. The lightpen 600 is typically a stylus type apparatus suitable for writing and, in the preferred embodiment, comprises a mechanical pencil model 0.5 mm sold under the tradename PENTEL modified by drilling a hole through the eraser. Optic fiber 401 may typically comprise 20 mil Crofon optic fiber manufactured by the DuPont Corp. Photodiode 404 may typically comprise a PIN photodiode model MD-1 manufactured by the Monsanto Commercial Product Corp.

Changes in the conduction characteristics of photodiode 404 due to incident light energy are sensed by amplifier 405, which generates an output to decision flip-flop 406. When the output of amplifier 405 exceeds a preset level, decison flip-flop 406 is set and its output is counted by output counter 407. Output 407 generates an output on line 104 to the control circuit 102 and an output on line 203 to the register 200 when a count of three has been achieved. As previously discussed, the output on line 203 will cause display of the trace and the output on line 104 will cause control circuit 102 to acquire the first and second binary words indicative of the position of the lightpen 600 on the face of the display 500.

The sensor 400 receives various reset signals from the timer 300 over line 402. The reset signals appearing on line 408 occur every time a horizontal blanking signal is generated and are thus utilized to reset the decision flip-flop 406 at the beginning of every T.V. line. The reset signals appearing on line 409 occur every time the vertical blanking signal is generated as well as during each frame in which lightpen position measurement is not enabled (i.e., the one frame out of four during which the trace is displayed). In this manner, the output counter 407 is held at 0 during the display of the lightpen trace, and, in addition, is reset once during every frame. Consequently, the output counter 407 generates output signals on lines 104 and 203 only when the decision flip-flop 406 is set the third time during a frame when the lightpen position measurement is enabled. This is done to select the display element under the lightpen from the large number of display elements seen by the wide field of view of the optic fiber.

As noted previously, the computing means 100 includes a digital computer 101. Digital computer 101 may be of the PDP-8 family of mini or microcomputers pioneered and manufactured primarily by Digital Equipment Corporation and typically may be of the microprocessor type MP-12 manufactured by FabriTek, Inc. In accordance with the methods and apparatus of the preferred embodiment of the present invention, computer 101 is programmed, in general terms, in accordance with the flow chart shown in FIG. 6. It will be appreciated that the main function of computer 101 is to appropriately acquire the first and second binary words and, on the basis thereof, to decode the handwritten symbols on the face of the display 500. In order to properly accomplish this function, various other ancillary functions must also be accomplished.

It will be appreciated that the flow chart is to be implemented in instructions stored in the core memory of computer 101. In addition, the preferred embodiment contemplates the storage of these instructions in the interconnections of a read-only-memory ROM for use with more modern computing means of the PDP-8 family.

The operating program associated with the present invention and shown by the flow chart of FIG. 6 is initially called to perform its functions by an interrupt caused by timer 300 or sensor 400. After performing its function the computer 101 returns to the interrupted program until a next interrupt occurs. The interrupted program is diagrammatically represented in FIG. 6 by block 800, background, whose functions generally may comprise those interfacing the computer 101 to the peripheral equipment 700. Once during the execution of each instruction of the background program, the logic hardware of computer 101 will test the interrupt circuit. In the absence of an interrupt, diagrammatically represented by the no exit from block 801, the next instruction in the background program will be executed. However, in the case of the occurrence of an interrupt, diagrammatically represented by the yes exit from block 801, an Interrupt Subprogram, represented by clock 802, will be executed.

The function of the Interrupt Subprogram 802 is to ascertain the source of the interupt and to award an appropriate priority thereto. The Interrupt Subprogram 802 must also determine the current service status of any prior received interrupts. Upon determining that the interupt must be serviced, the Interrupt Subprogram 802 will prepare the computer for return to the interrupted program 800 after completion of the functions necessary to service the interrupt.

These are various interrupts generated by the circuitry of the present invention which the Interrupt Subprogram 802 must be capable of processing. Initially, since register 200 contains storage for only one sentence, the computer 101 must, in addition to being instructed when to output data for the sentence at the top of the display, also be instructed when to output data for a following sentence. Therefore, the timer 300 generates two types of interrupts. A first type of interrupt is generated by the timer 300 at the beginning of each frame and a second type is generated after the display of a complete sentence except for the last sentence when a first type is generated. Computer 101 will then output data for a first sentence in response to an interrupt of the first type and will output data for subsequent sentences in response to interrupts of the second type. In addition to the first and second types of interrupts generated by the timer 300, the Interrupt Subprogram 802 must be capable of processing a lightpen interrupt from sensor 400. In response to the lightpen interrupt, the computer 101 will place the first and second binary words in its memory.

Returning to the flow chart of FIG. 6, if the interrupt received by Interrupt Subprogram 802 is of the first type, diagrammatically represented by the yes exit from block 804, the instructions represented by the block 805 will reset the output data pointer whereby the instructions represented by block 806 will cause the output of a sequence of six-bit codes representative of the sequence of symbols to be displayed for the first sentence. If the interrupt is of the second type, diagrammatically represented by the no exit from block 804, the instructions represented by block 806 will cause the output of six-bit codes for the next sentence.

If the interrupt was a lightpen interrupt, instructions diagrammatically represented by block 808 will be executed causing the input of the first and second binary words. Since a lightpen interrupt can be caused either by light from a displayed symbol or light from letterarea 530, the condition which caused the interrupt must be determined. This determination is made by instructions represented by blocks 809 through 813. The action taken as a consequence of the decision made in blocks 809 through 813 are represented by blocks 1000, 900 and blocks 814 through 818. For reason of their particular significance to the present invention, the instructions diagrammatically represented by blocks 900 and 1000 will be described in further detail hereinafter. In general, the instructions represented by block 1000 cause the input data to be either entered into a first file or ignored, in the case of repetitious data. The instructions diagrammatically represented by block 900 cause the data stored in the first file to be decoded into a data processing code representative of the traced symbol.

Referring to the blocks 809 through 813, if the lightpen interrupt was caused under the condition Letterarea Not Defined (i.e., no letterarea appearing on the face of the display 500), the no exit from block 809, then a letterarea will be defined in the position of the lightpen 600. This is accomplished by the instructions diagrammatically represented by block 817. Block 817 calls up from a non-displayed storage location the letterarea code and inserts it in place of the code of the symbol the lightpen is pointing at. And, at the same time, block 817 will cause the code for the replaced symbol to be placed in a storage location hereinafter referred to as RETAIN. If, on the other hand, a letterarea is defined and the lightpen 600 is pointed at the letterspace, the yes exit from blocks 809 and 810, then the instructions represented by block 1000 are executed whereby the first and second binary words will be entered into the first file as appropriate.

If the letterarea is defined and the lightpen is not pointed at the letterspace or letterborder for two consecutive interrupts (the yes, no and yes exits from blocks 809, 810, and 811, respectively), block 812 is executed to determine whether the lightpen is positioned over the letterend. The NO exit from blocks 812 indicates that the lightpen is not positioned over the letterend and must therefore be positioned over a symbol. This condition will cause the instructions represented by block 815 to be executed. The instructions represented by block 815 will interchange the symbol code stored in RETAIN with the letterarea code. That is, the symbol originally replaced by the letterarea by the instructions of block 817 in response to a no decision from block 809 will reappear on the display 500. After the instructions of block 815 have been executed, the instructions represented by block 817 are reexecuted, whereby the code of the symbol the lightpen is currently pointing at is placed in RETAIN and the letterarea code is substituted therefor. Therefore, if a yes decision results from execution of block 810, data will be entered into the first file. If a no decision results from execution of block 810, a letterarea will be displayed in a position different from the then existing letterarea position.

The yes exit from block 812 indicates that the lightpen 600 is positioned over a letterend and causes the instructions represented by block 813 to be executed. If the number of entries in the first file is less than three (indicating that a complete symbol has not been written) the yes exit from block 813, the letterarea is shifted one position by a process of interchanging symbols analogous to that described with respect to blocks 815 and 817. Thus, the symbol originally appearing at the position from which the letterarea was shifted will reappear and the symbol (or lack of symbol) to which the letterarea is shifted will be replaced by letterarea. The code of the latter replaced symbol will then be placed in the storage location RETAIN.

If the number of entries in the first file is larger than or equal to three (indicating that a complete symbol has been written), the no exit from block 813, then the instructions represented by block 900 are executed. The instructions represented by block 900 decode the written symbol into a data processing code, here the USASCII code. The code for the decoded symbol will then be acted upon by the application subprogram 818, the details of which will depend upon the end use of the system. For example, in an editing application, the application subprogram 818 may contain instructions equivalent to the instructions represented by blocks 815 and 817 whereby the decoded symbol would be displayed and the letterarea would appear at the adjacent position for further editing.

The following is intended, by way of example, to facilitate the understanding of and to clarify the use of the operating program associated with the present invention by enumerating the specific steps followed in a typical application of the program. The following exemplary recitation describes one function of a class of functions comprising a text editing application. For purposes of clarity, in the following example a text as displayed on the face of the display 500 will be capitalized and the letterarea identified by the symbol #.

Assume that the text output of an automatic transcription system is displayed on the face of the display 500 in part as follows:

1

... WHO ELSE HANCE OUT THERE BESIDES .

The objective of the operator will thus be to change the word "HANCE" to "HANGS". The operator's initial manipulation will be to point the lightpen 600 to the "C" in the word "HANCE". With respect to FIG. 6, the following will occur:

2

| | |
|---|---|
| yes, Interrupt | -block 801 |
| yes, Lightpen interrupt | -block 803 |
| no, Letterarea defined | -block 809 |
| Define Letterarea in position lightpen aimed at | -block 817 |

Without any apparent elapse of time the operator will see, in part, the following:

3

... WHO ELSE HAN#E OUT THERE BESIDES .

The operator will then write the letter "G" in the letterspace during which, the following occurs:

4

| | |
|---|---|
| yes, Interrupt | -Block 801 |
| yes, Lightpen interrupt | -Block 803 |
| yes, Letterarea defined | -Block 809 |
| yes, Lightpen on letterspace | -Block 810 |
| Data Input to first file | -Block 1000 |

At the end of the trace the operator places the lightpen 600 over the letterend and the following occurs:

5

| | |
|---|---|
| yes, Interrupt | -block 801 |
| yes, Letterarea defined | -block 809 |
| no, Lightpen on previous position | -block 811 |
| Set previous position | -block 814 |

During the next frame of the display, the following occurs:

6

| | |
|---|---|
| yes, Interrupt | -block 801 |
| yes, Letterarea defined | -block 809 |
| yes, Lightpen on previous position | -block 811 |
| yes, Lightpen on letterarea | -block 812 |
| no, number of entries smaller than three | -block 813 |
| Decode sumbol | -block 900 |

The output of the instructions represented by block 900 will be the USASCII code for the letter "g". The Application Subprogram, diagrammatically represented by block 818, for this particular function in the text editing application, will shift the letterarea one position and place and code for the letter "g" in the position previously occupied by the code for the letter "c". The display 500 will thus show:

7

... WHO ELSE HANG# OUT THERE BESIDES .

The same sequence of events previously described will again occur when the operator traces the letter "s" in the letterspace. The display will show, in part, the following:

8

... WHO ELSE HANGS#OUT THERE BESIDES .

The operator can now point the lightpen 600 at another letter to be changed or, employ a control sign, to indicate that the editing task is completed. In either event, the display will show, in part, the following:

9

... WHO ELSE HANGS OUT THERE BESIDES ..

GENERAL WORD STATEMENT OF THE ALGORITHM

In order to facilitate the actual coding of a program in accordance with the present invention, it is considered helpful to logically develop the word statement of the algorithm used in subprogram 900 and to explicitly enumerate the steps involved in its implementation. Accordingly, the use of the algorithm in subprogram 900 as well as the use of appropriate control sequences to actually code subprogram 900 will be discussed in detail hereinafter.

For purposes of clarity, a summary of the detailed discussions previously advanced, as the discussion directly applied to the development of the word statement, will be presented. It will be recalled that two binary words, a first binary word and a second binary word, represent the position of the lightpen 600 over the letterarea by means of the numerical values of the XF counter 304, the XC counter 309, and the YF counter 314. The numerical values of the aforementioned counters are transferred to computer 101 wherein subprogram 1000 places the first and second binary words in a first file. The first file actually comprises a first list of numerical values representing the state of the XF counter 304 and a second list of numerical values representing the state of the YF counter 314. In the context of this background it is considered helpful, for purposes of clarity, to at this time advance certain definitions and notations to be used in developing the word statement of the algorithm. Thus, the following definitions are presented:

Define VXF as the vector consisting of the first list of numerical values and $n$ as the number of entries in the first list.

Define VYF as the vector consisting of the second list of numerical values and $m$ as the number of entries in the second list.

Define order as the number of the positon of a code in a list or a file.

Define a function F as a function which retains the smaller of two numbers as well as the order of the retained number.

Define a second file SH as a file having a number of stored sets of characteristic numbers, each set of characteristic numbers representing a symbol, such that the contents of the entire file SH defines all symbols that the system is capable of decoding.

Define a third file B as a list of binary codes corresponding to the second file SH such that, the order of a specific stored set of characteristic numbers for a specific symbol is the same as the order of the binary code for that specific symbol. In other words, for any number i the binary code for the specific symbol can be found in the ith place in file B and the corresponding set of characteristic numbers can be found in the ith place in file SH.

The discovery of the existence of a matrix M with which vectors VXF and VYF can be multiplied to derive a set of numbers H that are characteristic of the written symbols is a key feature of the present invention. The set of numbers H, the first half of which comprise a first subset HX and the second half of which comprise a second subset HY, are of the form:

$$HX = M \times VXF \quad (1)$$

$$HY = M \times VYF \quad (2)$$

For decoding the written sumbol the difference D between the stored characteristic numbers in the second file SH and the numbers H is determined. Calculation of the difference D is of the general form given below:

$$D = \sum_{s=1}^{a} (SH(s) - H)^2, \quad (3)$$

where s is the order of and a is equivalent to the magnitude of H or SH

The function F is then applied to a retained number A, where A is initialized at a value greater than any expected D, and the current calculated difference D. The retained number A is therefore replaced by the smaller of A and D and the order i is replaced by the order of the retained number. A mathematical expression for this operation is $$A, i = F(A, D). \quad (4)$$

Finally, the code for the decoded symbol in obtained by extracting the code from the third file B having the order i derived in equation (4). A mathematical expression for this operation is $$Code = B(i). \quad (5)$$

With regard to FIG. 2, it is apparent that the number of entries in the first and second list will be different for different traced symbols. For example, in practice a trace of the letter I may generate six or seven entries whereas a trace of the letter E will contain a significant number of entries. As a consequence, the dimensions of vectors VXF and VYF will vary, and the dimension of matrix M may continuously be adjusted accordingly. Therefore, the instructions diagrammatically represented by block 900 must either comprise the definition of a plurality of matrices to be used for matrix M, or, in the alternative, may comprise means for generating one matrix M as required by the dimensions n, m of the vectors VXF and VYF. On the other hand, the dimensions n, m of the vectors VXF and VYF can be equalized for different symbols so as to enable the use of only one matrix M. In choosing between these methods of implementation, it is clear that the method of equalizing the dimensions n, m by interpolation minimizes the number of necessary computer instructions. Therefore, the coding of the preferred embodiment of the present invention implements this interpolation method.

FIG. 7 shows diagrammatically a typical first or second list. The list shown contains 22 entries whose respective numerical values are represented by the height of the points above the base line. The circles denote the values of a new list constructed by interpolation and having eight entries. A word statement of the method of interpolation used to derive the new list is detailed hereinafter.

Initially, define a function G(x) which determines the largest integer number, including zero, equal to or smaller than x. Given a numerical value x, the coding of function G(x) is well known to those skilled in the art of programming. Now if n is the number of entries in the first list, a fourth list NX can be constructed from the first list through interpolation. If we define the order of this fourth interpolated list as p, the interval between two entries in the fourth list can be expressed as n/p. Therefore, if t is defined as the order of an entry in the fourth list NX then alpha (t) is the lower boundary of the interval in which the interpolated numerical value of NX lies and alpha (t)+1 is the corresponding upper boudary, where $$\alpha(t) = G\left(\frac{n}{p} \cdot t\right). \quad (6)$$

In other words, the numerical value of the interpolated list NX will lie between, inclusive, the numerical values VXF with order alpha (t) and alpha (t)+1.

Similarly, the numerical value NY lies between, inclusive, the numerical values VYF with order beta (t) and beta (t)+1, where $$\beta(t) = G\left(\frac{m}{p} \cdot t\right). \quad (7)$$

The values for NX(t) and NY(t) for all values of t from 0 through p−1 (in the preferred embodiment the value for p is eight) can be calculated as follows:

$$NX(t) = VXF(\alpha(t)) + (VXF(\alpha(t)) - VXF(\alpha(t)+1)) \cdot (((n \cdot t)/p) - \alpha(t)) \quad (8)$$

and, $$NY(t) = VYF(\beta(t)) + (VYF(\beta(t)) - VYF(\beta(t)+1)) \cdot (((m \cdot t)/p) - \beta(t)). \quad (9)$$

Since the operation of the instructions diagrammatically represented at block 1000 is such that two successive values in the first or second lists differ from each other by either of three values, zero, plus one or minus one, that part of the calculations required in equation (8) and (9) involving the multiplication of the difference of two successive values from the first and second list, reduces to a logical decision either that part of the calculation is zero or plus $(((n \cdot t)/p) - (t))$ or minus $(((n \cdot t)/p) - \alpha(t))$. The identical considerations applied to the calculation of NY(t). Since by definition of function G calculations of the form $(((n \cdot t)/p) - \alpha(t))$ are a binary function, equations (8) and (9) above can be performed with minimal instructional sequences thereby reducing the requirement for computational capacity of computer 101.

To further simplify the notational designations used herein a function I may be defined which performs the calculations defined in equations (6) and (8) on the numerical values of the first list and the calculations of equations (7) and (9) on the numerical values of the second list.

$$NX(t) = I(VXF,t) \; t = 0, \text{through}, p-1 \qquad (10)$$

$$NY(t) = I(VYF,t) \; t = 0, \text{through}, p-1 \qquad (11)$$

and second lists, VXF and VYF, by applying the interpolation function I to the first and second list. This calculation is represented by equations (10) and (11). The characteristic numbers HX can be derived from the fourth list NX(t) by multiplying the latter with a matrix M. Similarly, the characteristic numbers HY can be derived from the fifth list NY(t) by multiplying the latter with the matrix M. The calculations are as follows:

$$HX = M \cdot NX(t). \qquad (12)$$

$$HY = M \cdot NY(t). \qquad (13)$$

The difference between the ith stored set of characteristic numbers in the second file SH and the calculated characteristic numbers HX and HY can be expressed as the sum of the square of the differences between corresponding characteristic numbers. This calculation, which is performed sequentially for all symbols which the system is programmed to recognize, can be represented as follows:

$$D(i) = \sum_{j=1}^{u} (SHX(i,j) - HX(j))^2 + \sum_{k=1}^{v} (SHY(i,k) - HY(k))^2, \qquad (14)$$

where $u$ is the dimension of SHX and HX, $v$ is the dimension of SHY and HY, and $i$ is the order in file SH.

Upon obtaining the difference D(i), function F is applied to each component of the calculated difference D(i) where again, A is a retained number which is initialized at a value greater than any expected D(i). After all components of D(i) have been calculated the last result of the function F is the order of the decoded character. The code for the decoded character is then determined from the order in the third file B as previously described.

Derivation of matrix M is based upon a Fourier series analysis. As is well known the Fourier series is a mathematical series describing a periodic function as the sum of an average value and values of all harmonic cosine and sine functions. The coefficients of the cosine and sine functions can be calculated through integration, over the period, of the periodic function. If the function is known only through samples taken during a period, then the coefficients can be approximated through successive partial integration over the sampling period by assuming that the periodic function is linear over the sampling period. Thus, if as in the preferred embodiment data samples are assumed, the performance of the partial integration leads to formulae for the coefficients as follows:

$$a(0) = \tfrac{1}{4}(n(0)+n(1)+n(2)+n(3)+n(4)=n(5)+n(6)+n(7)). \qquad (15)$$

$$a(1) = \tfrac{\sqrt{2}-1}{\pi\delta}(n(0)\sqrt{2}+n(1)+n(3)-n(4)\sqrt{2}-n(5)-n(7)).$$

$$a(2) = \tfrac{1}{2\pi\delta}(n(0)-n(2)+n(4)-n(6)).$$

$$a(3) = \tfrac{\sqrt{2}+1}{9\pi\delta}(n(0)\sqrt{2}-n(1)+n(3)-n(4)\sqrt{2}+n(5)-(7)).$$

$$b(1) = \tfrac{\sqrt{2}+1}{\pi\delta}(-n(1)-n(2)\sqrt{2}-n(3)+n(5)+n(6)\sqrt{2}+n(7)).$$

$$b(2) = \tfrac{1}{2\pi\delta}(n(1)-n(3)+n(5)-n(7)).$$

$$b(3) = \tfrac{1+\sqrt{2}}{9\pi\delta}(n(1)=n(2)\sqrt{2}+n(3)-n(5)+n(6)\sqrt{2}-n(7)).$$

where $n(0) - n(7)$ are the numerical values of the samples,
(delta)$\delta$ is the sampling period,
$a(0)$ is the average value,
$a(1), a(2), a(3)$ are the coefficients for the cosine harmonics, and
$b(1), b(2), b(3)$ are the coefficients for the sine harmonics;
and where the fourth and fifth lists, NX and NY each contain numerical values for $n(0)$ through $n(7)$.

Since one objective of the present invention is to analyze the shape of a written symbol, and since the average value $a(0)$ contains information regarding only the position of the written symbol within the letterspace 512, coefficient $a(0)$ is not utilized in the preferred embodiment of the invention. Furthermore, in order to minimize computational instructions without losing information regarding the shape of the written symbol, the remaining Fourier coefficients may be rewritten in terms of $h$ coefficients as follows:

$$\begin{aligned} h(1) &= n(0)\sqrt{2}+n(1)+n(3)-n(4)\sqrt{2}-n(5)-n(7) \\ h(2) &= n(0)-n(2)+n(4)-n(6) \\ h(3) &= n(0)\sqrt{2}-n(1)+n(3)-n(4)\sqrt{2}+n(5)-n(7) \\ h(4) &= n(1)-n(2)\sqrt{2}-n(3)+n(5)+n(6)\sqrt{2}+n(7) \\ h(5) &= n(1)-n(3)+n(5)-n(7) \\ h(6) &= n(1)-n(2)\sqrt{2}+n(3)-n(5)+n(6)\sqrt{2}-n(7) \end{aligned} \qquad (16)$$

By defining a vector H as comprising the coefficients $h(1)$ through $h(6)$ and a vector N comprising the elements $n(0)$ through $n(7)$, then a convenient notation for the system of equations shown above could be written as follows:

$$H = M \cdot N \qquad (17)$$

In view of equations 16 and 17 above, matrix M can now be defined as:

$$M = \begin{vmatrix} \sqrt{2} & 1 & 0 & -1 & -\sqrt{2} & -1 & 0 & 1 \\ 1 & 0 & -1 & 0 & 1 & 0 & -1 & 0 \\ \sqrt{2} & -1 & 0 & 1 & -\sqrt{2} & 1 & 0 & -1 \\ 0 & -1 & -\sqrt{2} & -1 & 0 & 1 & \sqrt{2} & 1 \\ 0 & 1 & 0 & -1 & 0 & 1 & 0 & -1 \\ 0 & 1 & -\sqrt{2} & 1 & 0 & -1 & \sqrt{2} & -1 \end{vmatrix} \qquad (18)$$

It will be appreciated that an operation involving multiplication by zero, in the coding of the preferred embodiment, requires no operation. Therefore, a matrix with more zero elements will result in a subprogram consisting of less operations. Experimentation with a decoding subprogram with matrix M and with a decoding subprogram with matrix MA, shown below, reveals only inconclusive differences and decoding performance between the two subprograms.

$$MA = \begin{vmatrix} \sqrt{2} & 1 & 0 & -1 & -\sqrt{2} & -1 & 0 & 1 \\ 1 & 0 & -1 & 0 & 1 & 0 & -1 & 0 \\ 0 & 1 & 0 & 0 & 0 & 0 & 0 & 0 \\ 0 & -1 & -\sqrt{2} & -1 & 0 & 1 & \sqrt{2} & 1 \\ 0 & 1 & 0 & 0 & 0 & 0 & 0 & 0 \\ 0 & 1 & 0 & 0 & 0 & 0 & 0 & 0 \end{vmatrix} \quad (19)$$

Experimentation has further verified that a subprogram employing a matrix MB, a shortened version of matrix MA, and a subprogram employing a matrix MC reveals inconclusive differences in decoding performance between these two subprograms. Because multiplication by one and a half can be conveniently implemented in the coding of a program by a shift and add operation, the preferred embodiment of the present invention employs matrix MC. Matrices MB and MC are as follows:

$$MB = \begin{vmatrix} \sqrt{2} & 1 & 0 & -1 & -\sqrt{2} & -1 & 0 & 1 \\ 1 & 0 & -1 & 0 & 1 & 0 & -1 & 0 \\ 0 & -1 & -\sqrt{2} & -1 & 0 & 1 & \sqrt{2} & 1 \end{vmatrix} \quad (20)$$

$$MC = \begin{vmatrix} 1.5 & 1 & 0 & -1 & -1.5 & -1 & 0 & 1 \\ 1 & 0 & -1 & 0 & 1 & 0 & -1 & 0 \\ 0 & -1 & -1.5 & -1 & 0 & 1 & 1.5 & 1 \end{vmatrix} \quad (21)$$

It will be understood that although a specific series of matrices have been defined above, there may be other matrices which perform adequately with only minor or inconclusive differences in matrix elements. It will also be understood that by chosing a smaller set of symbols which subprogram 900 is capable of decoding a further reduction in the size of the matrix utilized can be expected. Finally, it will be recognized that for values of $p$ other than 8 a matrix having dimensions other than that shown will be required.

Experimentation has also revealed that an inconclusive difference in decoding performance results when the difference represented by equation (14) is replaced by a difference based upon absolute values. Because a difference based on absolute values lends itself to more minimal implementation it is utilized in the preferred embodiment of the present invention. The difference based upon absolute values, which comprises the sum of the absolute values of the differences between the stored characteristic numbers SH and the calculated characteristic numbers H, may be expressed as follows:

$$DA(i) = \sum_{j=i}^{u} |SHX(i,j) - HX(j)| + \sum_{k=1}^{v} |SHY(i,k) - HY(k)| \quad (22)$$

where $u$ is the dimension of SHX and HX,
$v$ is the dimension of SHY and HY, and
$i$ is the order of file SH.

A final word statement of the algroithm used in the preferred embodiment of the present invention may now be expressed as follows:

$NX(t) = I(VXF,t)$, $t=0$ through 7
where $NX(t)$ defines each element of the fourth list by calculating the interpolation function $I$ on the first list $VSF$;
$NY(t) = I(VYF,t)$, $t=0$ through 7
where $NY(t)$ defines each element of the fifth list by calculating the interpolation function $I$ on the second list $VYF$;
$HX = MC \cdot NX$,
where $HX$, one half of the calculated characteristic numbers, is derived by multiplication of matrix $MC$ with $NX$;
$HY = MC \cdot NY$,
where $HY$, the other half of the calculated characteristic numbers, is derived by multiplication of matrix $MC$ with $NY$;

$$DA(i) = \sum_{j=i}^{3} |SHX(i,j) - HX(j)| + \sum_{k=1}^{3} |SHY(i,k) - HY(k)|,$$

where $DA$, the difference calculation, is the sum of the absolute values of the difference between corresponding elements in $SHX$ and $HX$ added to, the sum of the absolute values of the differences between corresponding elements in $SHY$ and $HY$;
$A,i = F(A, DA(i))$,
where the retained value $A$ and its order $i$ is determined by function $F$ after each calculation of $DA(i)$; and
$Code = B(i)$
where after calculation of all values of $DA(i)$, the desired code is the $i$th entry of the third file B.

A detailed flow chart representation of the instructions with which the improved algorithm for the decoding subprogram 900 can be implemented is shown in FIG. 8. The flow chart of FIG. 8 uses the computational notations hereinbefore defined and discloses the control sequences needed for execution of the subprogram.

Initially, the instructions diagrammatically represented by blocks 951 through 956 are utilized to derive eight interpolated values for each of the interpolated lists NX and NY. Block 951 represents instructions which set the program variable C to the vector VXF, the program variable $tt$ to an initial condition of zero and the program variable $ii$ to an initial conditon of zero. The program variable $ii$ is used by the instructions represented by block 1000 to initialize the first and second lists, VXF and VYF, for entry of data. The program variable $tt$ is used to control the computation of the eight values for each of the lists NX and NY.

The eight interpolated values for the NX list are computed in a program loop comprising blocks 952, 953, 954 and the no exit from block 955. The result of the computations performed by this loop are eight program variables $n(0)$ through $n(7)$ which contain the eight interpolated values of the NX list. The yes exit from block 955 indicates that computation of the first eight program variables $n(0)$ through $n(7)$ has been completed. The instructions represented by block 956 will then set the program variable C to the vector VYF representing the second list YF. The computation then proceeds through the same program loop comprising block 952, 953, 954 and the no exit of block 955 whereby the program variables $n(8)$ through $n(15)$ are computed. The program variables $n(8)$ through $n(15)$ comprise the eight interpolated values of the NY list. The computations in this program loop are terminated by the yes exit from block 954 after program variable $n(15)$ has been computed.

The instructions diagrammatically represented by blocks 957 through 962 implement the calculation of H from the NX and NY lists. In this regard, block 957 represents instructions which set the initial conditions for calculation of H by setting program variable C to the values of program variables $n(0)$ through $n(7)$ and program variable $tt$ to an initial value of zero.

The first three values of H, i.e., HX or H(0) through H(2), are calculated in the program loop comprising blocks 958, 959, 960 and the no exit from block 961. The notation MC (tt) in block 958 represents the $tt$ row of matrix MC. The yes exit from block 961 causes the execution of of instructions setting the program variable C to the program variable $n(8)$ through $n(15)$ which contain the eight interpolated values of the NY list. The computation then proceeds through the execution of the program loop as described above whereby the values H(3) through H(5), i.e., the HY list, are computed. The yes exit from block 960 represents that the calculation of H(0) through H(5) has been completed.

The instructions diagrammatically represented by blocks 963 through 971 compute the difference function DA and the retained value function F by means of a third program loop comprising blocks 965 through 968 and a final program loop represented by blocks 964 through 971.

In the embodiment of the present invention, the SH file, comprising the characteristic numbers for each symbol the system is programmed to recognize, includes six characteristic numbers. The accumulation of the difference between the numbers in the second file SH and the numbers in H, i.e., DA, for each stored symbol against which the traced symbol is to be compared is controlled by the third loop. The fourth program loop, block 964 through 971 insures that this comparison is accomplished for each of the stored symbols. The comparison calculations are initialized by instructions represented by block 963 which initializes program variable A, in which the smallest of two values is retained, to its maximum value, program variable $i$, in which the order of the small list of these differences is retained, to zero and control program variable $jj$ to zero. The instructions represented by block 964 initialize the execution of the third loop, block 965 through 968, by setting both program variable DA, which accumulates the calculated differnce, and program variable $tt$, which controls the execution of the third loop, to zero.

The difference DA in respect to each stored symbol is calculated by the instructions represented by block 965 and 966 wherein block 965 representes the calculation of the absolute value of the difference between a corresponding stored characteristic number of file SH and a calculated characteristic number contained in H. The instructions represented by block 966 then accumulates the difference for a particular stored symbol in program variable DA. The program loop is terminated by means of the yes exit from block 968.

The difference DA corresponding to a particular stored symbol is then applied to block 969 which executes function F and retains the results in program variables A and $i$. The value retained in program variable A will be the smaller of the value currently in A and the current computed value of DA. The value retained in program variable $i$ will be the value of $jj$ if DA proves to be smaller than A or remains unchanged if variable A is equal to or smaller than DA. Execution of the fourth loop, blocks 964 through 971, is controlled by program variable $jj$, which is unitarily incremented by instructions represented by block 970. The value $q$ used by the instructions represented by block 971 to ascertain the termination of the fourth loop, represents the number of stored symbols the system is programmed to recognize. When the program variable $jj$ exceeds the value $q$, execution of the fourth loop is terminated by means of the yes exit from block 971.

Finally, the instructions represented by block 972 select the ith entry in the third file B to store in location CODE. In the preferred embodiment of the present invention, the code employed by the third file B is the United States of America Standard Code for Information Interchange (USASCII).

The characteristic numbers comprising file SH may be derived as follows. Most micro or mini computers have a program debugging utility available. This utility permits keyboard data entry into memory, printout of designated memory contents and starting and stopping the execution of a program at designated locations. The program according to FIG. 8 and a debugging utility of this type can be used to calculate file SH. Lists VXF and VYF can be typed in, program execution can be started at block 951 and stopped after block 960 and then H can be printed out. By repeating this procedure for each of the symbols comprising the set of predetermined symbols, a complete SH file can be derived.

In order to clarify the detailed description to follow of the flow chart for data input corresponding to block 1000 in FIG. 6, a general discussion of the problem and a word statement of the algorithm is considered useful. In this regard, the instructional sequence represented by block 1000 enters data into the first file in response to inputs to computer 101 by the control circuit 102. And, as will be recalled, the data so entered is a result of the determination by the output counter 407 of the sensor 400 that the light detected is indicative of the lightpen 600 position.

Since writing with lightpen 600 is closely analogous to writing with a pencil on square ruled paper, it can be expected that lightpen 600 will occasionally traverse the confines of letterspace 512 and be positioned otherwise, such as over the letterborder 511. Under these circumstances, and as previously described, the output counter 407 will prevent an output. It can further be expected that, on occasion, the lightpen 600 will be moved back over the letterspace 512. Under these circumstances, the output counter 407 will generate an output whereby two successive entries in the first and second lists may differ by more than plus or minus one. To prevent the occurrence of such a condition, instructions are included within the instructions diagrammatically represented by block 1000 to appropriately "fill-in" the first and second list.

It may also occur that an operator who carefully traces a character and carefully lifts the lightpen 600 up after each stroke on the face of the display 500 may achieve a different trace from an operator who slurs the lightpen 600 over the face of the display 500. Without corrective procedure, the first and second lists for the respective characters will differ and thereby minimize the usability of the present invention. Accordingly, instructions are included within the instructions diagrammatically represented by block 1000 to equalize the first and second lists under circumstances of this type.

Another specific problem which may occur in connection with the date entry operation results when the lightpen 600 is positioned in such a manner that a substantially equal amount of light enters the lightpen 600 from two adjacent lightspots. In this case, the decision on lightpen position will be made by an instantaneous state of the electronic circuitry generally known as noise. A lightpen position in this manner may cause a number of entries to be made in the first file so that it appears that the lightpen is moved between adjacent lightspots whereas, in fact, the lightpen is stationary. Accordingly, the instructions diagrammatically represented by block 1000 include instructions which allow data entry in the first file only when the difference between the current values of the first and second binary words and the last entry in the first file indicate that the lightpen has moved a distance of one letterarea element away from the position corresponding to the last entry in the first file.

In the following discussion the aforementioned auxiliary instructions to the instructions diagrammatically represented by block 1000 will be initially enumerated in a word statement of the algorithm followed by a flow chart representative of the actual coding of the instructions. With regard to the first set of auxiliary instructions, i.e. those for filling in the first and second lists, the word statement of an appropriate algorithm may be developed as follows. Initially, a first absolute value AA is defined as follows:

$$AA = |XF - VXF(n)|, \quad (23)$$

where
$XF$ identifies that part of the first binary word representative of the numerical value of the $XF$ counter 304, and
where
$VXF(n)$ identifies the last entry in the first list.

A corresponding absolute value $BB$ may be defined as $$BB = |YF - VYF(m)|, \quad (24)$$

where
$YF$ identifies that part of the second binary word representative of the numerical value of the $YF$ counter 314, and
where
$VYF(m)$ identifies the last entry in the second list.

Depending upon the manner in which the absolute values $AA$ and $BB$ satisfy the conditions $$AA > 1, AA > 3$$

and $$BB > 1, BB > 3 \quad (25)$$

one of three sets of instructions will be executed in order to alleviate one of the aforementioned problems. The first set of instructions will fill in the first file in the case where the lightpen moves out of and then back into the letterarea, the second set of instructions will fill in the first file in cases where the trace has been slurred by the operator and the third set of instructions will alleviate the problem associated with positioning the lightpen over two adjacent lightspots. The three sets of instructions are generally implementations of the following expressions:

$$VXF(n+1) = VXF(n)+1 \quad (26)$$

$$VXF(n+1) = VXF(n)-1 \quad (27)$$

$$VXF(n+1) = VXF(n) \quad (28)$$

$$VYF(m+1) = VYF(m)+1 \quad (29)$$

$$VYF(m+1) = VYF(m)-1 \quad (30)$$

$$VYF(m+1) = VYF(m) \quad (31)$$

where expressions (26) and (29) define the next entry $VXF(n+1)$ or $VYF(m+1)$ in the first or second list by adding a value of one to the last entry $VXF(n)$ or $VYF(m)$, expressions (27) and (30) define the next entry by subtracting a value of one from the last entry and expressions (28) and (31) define the next entry to be equal to the last entry.

In general terms, if either absolute value AA or absolute value BB exceeds the limit 3 the second set of instructions are executed. In general terms, if the input values XF or YF differ by a value of more than one from the last entry in the first or second list, then repetitive execution of instructions implementing one of the expressions (26) through (31) will result in a number of entries in either list until the last entry is equal to the value of the respective input. And, if the input values XF or YF differ by no more than one from the last entry in the first or second lists, execution of the instructions will result in a new last entry equal to the value of the input. The detailed implementation of the first, second and third sets of instructions are shown in the flow charts of FIGS. 9 and 10 which are discussed in detail hereinafter.

Figure 10:
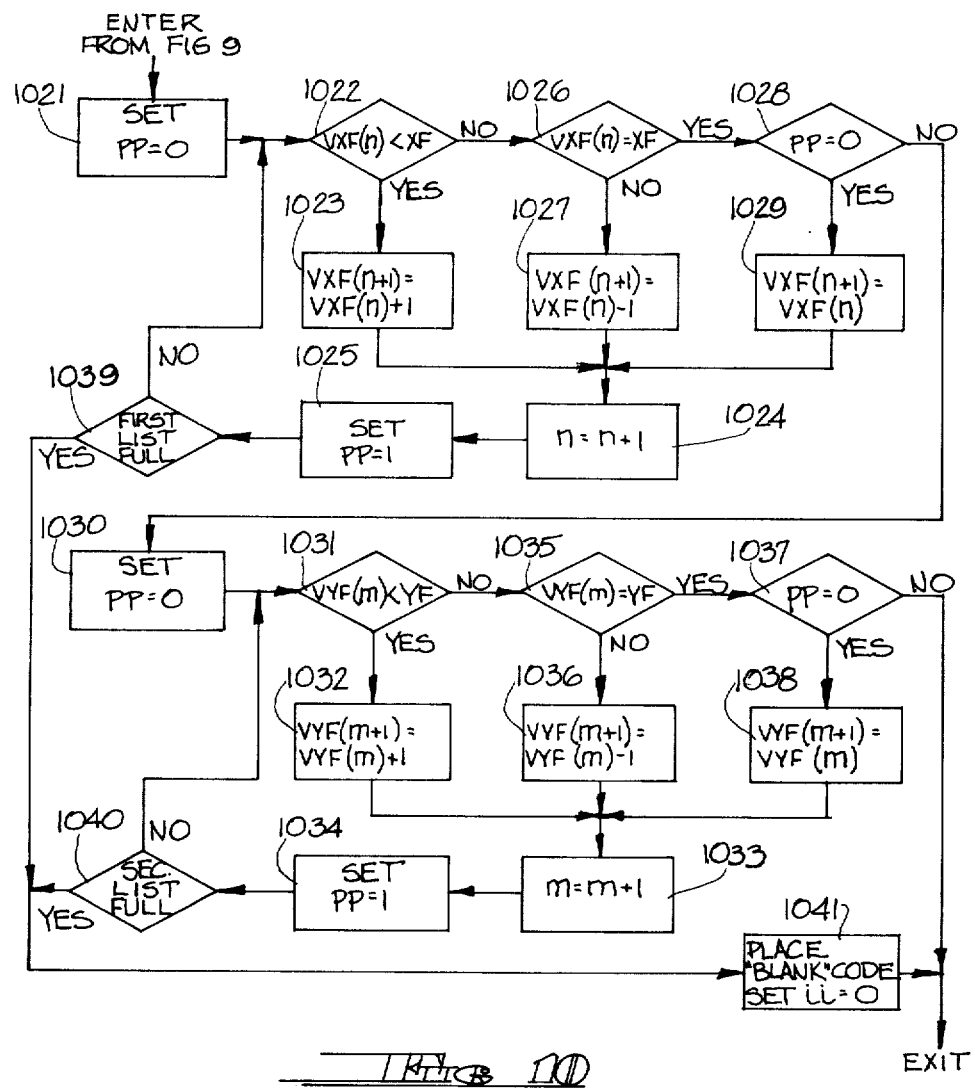
FIG. 10 is a second section of the flow chart shown in FIG. 9.

Initially, it will be understood that the instructions presented in the flow charts of FIGS. 9 and 10 represent the instructions diagrammatically represented by block 1000 in FIG. 6. With reference to FIG. 9, block 1001 represents the decision regarding whether or not the first and second lists need to be initialized for the entry of data caused by a new trace of the lightpen 600. Initialization of the first and second lists is accomplished by the instructions diagrammatically represented by blocks 1002 and 1003. The block 1002 instructions set program variable $ii$ to one and program variables $m$ and $n$ to the start values of the first and second lists. The block 1003 instructions then place the initial data entries into the first and second lists, whereafter the subprogram exits.

Upon a reentry of the subprogram, after the initial data entries in the first and second lists have been made, the subprogram will proceed from the no exit of block 1001. The instructions represented by block 1004 compute the absolute values AA and BB and the blocks identified by 1005a and 1005b determine whether these absolute values are greater than 1. When neither absolute value AA nor absolute value BB is more than one (the no exit from block 1005b), indicating that the lightpen 600 has not moved a distance of one letterarea element away from its previous position, the input data is ignored and block 1000 is exited. This operation implements the third set of instructions as previously explained.

If a yes decision results from block 1005b, the blocks identified by 1006a and 1006b determine whether the absolute values AA and BB are greater than three. If either absolute value of AA or BB exceeds three (indicating that the lightpen 600 has been lifted from its previous position and is now pointed at a different area of the letterspace), the yes exits from blocks 1006a and 1006b, the second set of instructions, represented by the flow chart of FIG. 10, will be executed. Otherwise, the no exit from block 1006b, the first set of instructions will be executed starting with the instructions diagrammatically represented by block 1008.

Block 1008 represents the decision regarding whether the next entry in the first list should be incremented by one with respect to the last entry. If the input data XF is larger than the last entry in the first file, a condition diagrammatically represented by the yes exit from block 1008, the next entry in the first list VXF (n+1) will be made larger by one through execution of the instrucionts represented by block 1011. On the other hand, the no exit from block 1008 leads to the decision block 1009 which determines whether input XF is equal to the last entry in the first list. The no exit from block 1009, indicating that the input XF is less than the last entry in the first list, leads to the execution of instructions represented by block 1012 which causes the next entry in the first list to be smaller by one than the last entry. The yes exit from block 1009 leads to the decision, in block 1010, of whether the input YF is equal to the last entry in the second list. The yes exit from block 1010 is indicative of the condition that the last entries in the first and second lists are equal to the input XF and YF and this completes the entry of data input into the first file for the current lightpen interrupt.

The no exit from block 1010 causes the next entry in the first list to be equal to the last entry, a condition dictated by the yes exit from block 1009. The exits from blocks 1011, 1012, and 1013 then cause the program variable n to be incremented by one in accordance with instructions represented by block 1014. This results in what has been identified now as the next entry to become, for future operations, the last entry.

The instructions diagrammatically represented by block 1042 determine whether the first list is full. The yes exit from block 1042 indicates that the first list is full and causes the instructions of block 1044 to be executed. The instructions represented by block 1044 cause the code for a blank or space to be placed in the location RETAIN, as previously indicated in connection with block 817 of FIG. 6. Also, block 1044 sets program variable ii to zero which, upon reentering the subprogram causes the first and second lists to be reinitialized. Finally, a first reset is generated to reset register 207 thereby erasing the written trace from the face of display 500.

Under normal conditions the input data representing a symbol trace will fill neither the first nor the second lists. Accordingly, the full list test represented by blocks 1042 and 1043 is intended as a check for an abnormal entry. However, the operator may, under certain circumstances, desire to fill the first or second list intentionally. This is easily accomplished by a "scratching out" motion of the lightpen 600 across the letterspace 512. The instructions represented by block 1044 will cause the display to show nothing. In effect, the operator has "scratched out" the symbol previously traced in this position.

Block 1015 represents the decision whether the input YF is larger than the last entry in the second list. The yes exit from block 1015 leads to the execution of the instructions represented by block 1016 which cause the next entry in the second list to be incremented by one with respect to the last entry. The no exit from block 1015 leads to the decision, represented by block 1017, whether the input YF is equal to the last entry. The yes exit from block 1017 causes the next entry to be equal to the last entry in the second list through the execution of instructions represented by block 1019. The no exit from block 1017, indicating that the input YF is smaller than the last value in the second list, causes the instructions represented by block 1018 to be executed, whereby the next entry is decreased by a value of one with respect to the last entry.

The exits from blocks 1016, 1018 and 1019 cause the program variable m to be incremented by one by means of instructions represented by block 1020. The exit from block 1020 causes block 1043 to decide whether the second list is full and corresponds to block 1042 for the first list. The function of block 1044 has been previously discussed and therefore will not be reiterated here. Finally, the no exit from block 1043 causes a return to the instructions diagrammatically represented by block 1008 whereby the logic represented by the first set of instructions may be repeated.

It will be recognized that the first set of instructions as described above and beginning with block 1008 of FIG. 9 causes the first file to be "filled" until the input XF or YF is equal to the last entry in the file.

The yes exit from blocks 1006a and 1006b, indicating that the absolute value AA or BB is greater than three, causes the execution of the second set of instructions commencing with the instructions diagrammatically represented by block 1021 in the flow chart of FIG. 10. In block 1021 program variable pp is set to zero. Program variable pp causes at least one entry to be made in either the first or second list when the last entry is equal to either input XF or input YF. This is to be contrasted with the first set of instructions which provide for no data entry after a determination has been made that the input is equal to the last entry.

Block 1022 provides for the determination as to whether input XF exceeds the last entry in the first list. The yes exit from block 1022 causes the next entry in the first list to be one more than the last entry in accordance with instructions represented by block 1023. The no exit from block 1022 leads to the decision as to whether the last entry is equal to the input XF. If the last entry is equal to the input XF, and no other entry has been made in the first list, represented by the yes exit from block 1028, then the next entry is caused to be equal to the last entry through execution of the instructions represented by block 1029. If the input XF is smaller than the last entry, represented by the no exit from block 1026, then the next entry is caused to be one less than the last entry through execution of the instructions represented by block 1027. The exits from blocks 1023, 1027 and 1029 lead to the instructions represented by block 1024 which cause the program variable n to be incremented by one. And, since the exit from block 1024 cannot be reached without at least one entry having been made in the first list, program variable pp is set to one by the instructions of block 1025. The functions of blocks 1039 and 1041 are identical to those previously discussed with respect to blocks 1042 and 1044 of the flow chart of FIG. 9 and will therefore not be discussed in detail.

Returning to block 1028, the no exit therefrom causes instructions represented by block 1030 to be executed whereby the program variable pp is reset to zero so as to insure the entry of at least one data item in the second list. As with block 1022, block 1031 represents the decision regarding whether the input XF is larger than the last entry in the second list. The yes exit from block 1031 indicates the input YF is larger than the last entry and thereby causes execution of the instructions diagrammatically represented by block 1032. The instructions represented by block 1032 will cause the next entry in the second list to be larger by one than the last entry of the list.

The no exit from block 1031 necessitates the decision as to whether input YF is equal to the last entry in the second list. If the input YF is less than the last entry, represented by the no exit from block 1035, the next entry will be made one smaller than the last entry by the instructions represented by block 1036. The yes exit from block 1035 requires the decision as to whether at least one entry has been made in the second list through the instructions represented by block 1037. The yes exit from block 1037, representing that no fill-in entries have been made in the second list, causes the next entry in the list to be equal to the last entry.

The exits from blocks 1032, 1036 and 1038 cause instructions represented by block 1033 to be executed whereby the program variable $m$ is incremented by one. And, since the exit from block 1033 cannot be reached without making one entry in the second list, program variable $pp$ is set to one by the instructions represented by block 1034. The no exit from block 1037 indicates that the last entry on the first list is equal to input XF and that the last entry in the second list is equal to input YF. This condition causes an exit from the instructional sequences diagrammatically represented by block 1000 in FIG. 6.

Although preferably comprising a general purpose digital computer, it will be apparent that the functions performed by computer 101 could be performed equally well by a customized network of digital components. One such embodiment of a digital computing means 1800 designed for implementation with digital large scale integration circuit techniques is shown in general block diagram FIG. 11. A detailed block diagram of the digital computing means 1800 of FIG. 11 is shown in FIG. 12 and described in detail hereinbelow.

Figure 12:
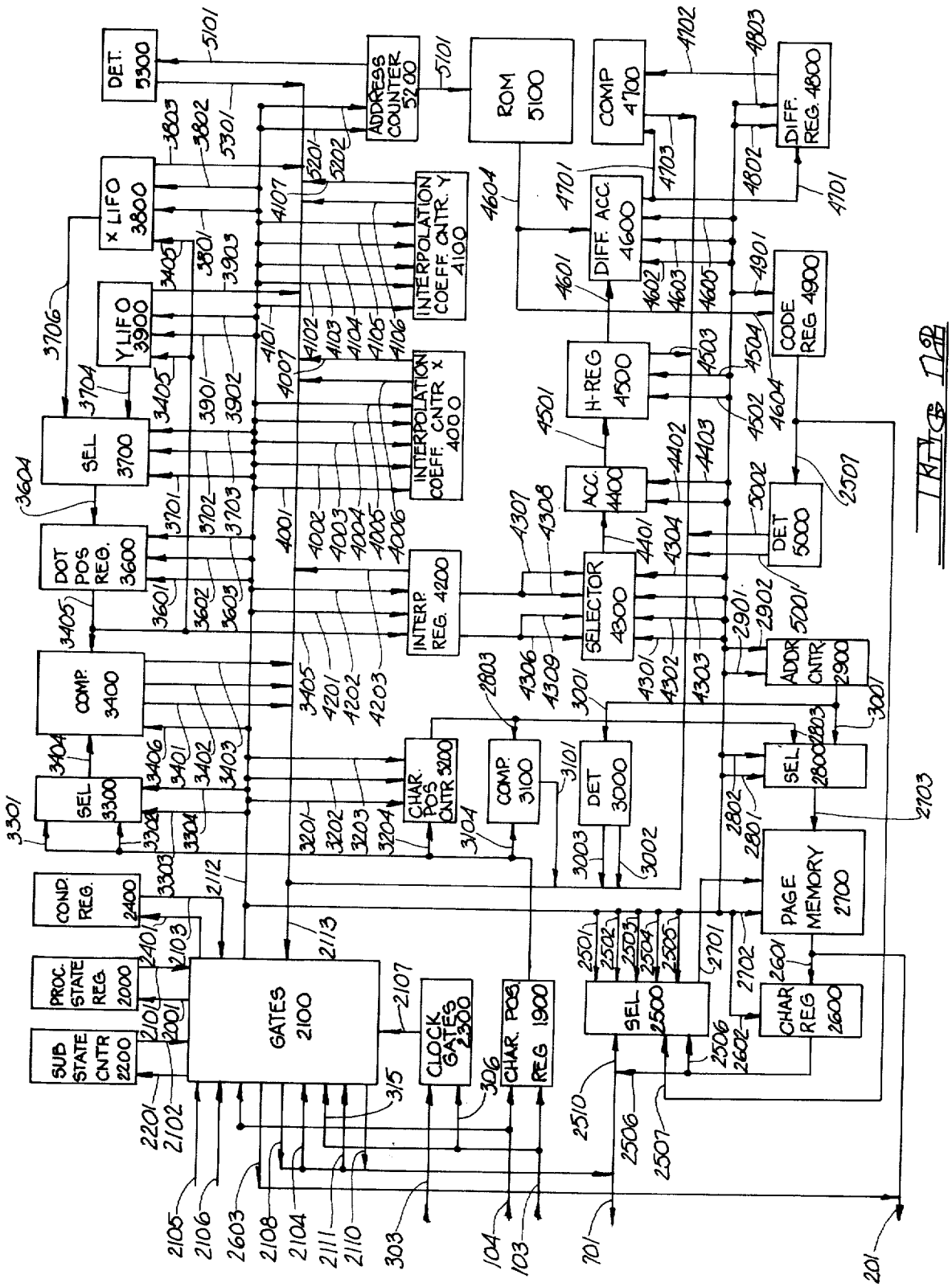
FIG. 12 is a detailed block diagram of a digital computing means for implementation in digital large scale integrated circuits.

The digital computing means 1800 of FIG. 11 and FIG. 12 perform the same functions as blocks 800, 805, 808, 1000, 814, 815, 816, 900, 806, 817 and 818 diagrammatically represented in FIG. 6. The digital computing means 1800 is designed to perform its functions in real time such that one function is completed before signals from timer 300 or sensor 400 can initiate the performance of the next function, whereas the computing means for implementation of FIG. 6, while performing the same functions, is interrupt driven as described heretofore.

The functions of the digital computing means 1800 of FIG. 11 and FIG. 12 are performed during nine process states. Process state 0 is the halt state, and is comparable to the function of block 800 Background in FIG. 6, wherein no data processing takes place. During process state 1 data is input to page memory 2700 from peripheral 700. Similarly, data output from page memory 2700 to peripheral 700 occurs during state 9. Input and output of data are functions diagrammatically represented by block 818, Application Sub-Program, in FIG. 6. The function diagrammatically represented by block 806, Output Data Words, in FIG. 6, is identical to the function performed during process state 2, in which one sentence of data is transferred from page memory 2700 to register 200. The function diagrammatically represented by block 817, Define Letterarea, is identical to the function performed during process state 3, in which the letterarea code is placed in the memory location of the character over which lightpen 600 is positioned. The functions diagrammatically represented by block 815, Erase Letterarea, and block 817, Define Letterarea, are identical to the function performed during process state 4. The function diagrammatically represented by block 1000, Data Input to First File, is identical to the function performed during process state 5. The input data is stored in Last-In First-Out (LIFO) memories 3800 and 3900, to be described hereafter, which perform a function identical to the function of the First File. The function diagrammatically represented by block 900, Decode Symbol, represented in more detail in FIG. 8, is performed during process states 6, 7 and 8. The interpolation function is diagrammatically represented by block 952, Compute N($tt$). The digital computing means of FIG. 11 and FIG. 12 performs the interpolation function during process state 6. The result of interpolation is stored in Interpolation Register 4200 to be described. The matrix computation is diagrammatically represented by block 958, Compute H($tt$). The digital computing means of FIG. 11 and FIG. 12 performs the matrix computation during process state 7, with the results being stored in H-Register 4500. Finally, the function to select the best comparison is diagrammatically represented in block 965 Compute DD, block 966 Compute DA, and block 969 Compute A,$i$. This function is performed during process state 8 in the digital computing means of FIG. 11 and FIG. 12, wherein the selected code is stored in Code Register 4900.

The digital computing means 1800 of FIG. 11 and FIG. 12 interfaces with register 200 through lines 201, with timer 300 through lines 103, with sensor 400 through line 104, and with peripheral apparatus 700 through bidirectional lines 701, and derives time and clock pulses from crystal clock 302 in timer 300 through line 303. The objective of data processing by the digital computing means 1800 is to decode the handwritten trace made by lightpen 600 over letterspace 512 and to insert the selected symbol into a display frame for display by display 500 or, upon operator command, to output data to peripheral apparatus 700. To attain this objective, the digital computing means 1800 comprises control circuits, data circuits and auxiliary circuits. Each of these classes of circuits is described in general next.

The auxiliary circuits consist of clock gates 2300 and character position register 1900. Clock gates 2300 provides digital computing means 1800 with a repetitious plurality of pulses upon which the control actions take place. Character position register 1900 is a register in which the instantaneous value of timer 300 is retained for use in further data processing.

The control circuits comprise process state register 2000, gates 2100, substate counter 2200 and condition register 2400. The control circuits respond to incoming signals called measurements, and in association with the aforementioned counter and registers, respond with outgoing signals called stimuli.

The data circuits of digital computing means 1800 are numbered 2600 through 5300. These data circuits perform certain functions, defined hereinafter, in response to stimuli and provide certain measurements, defined hereinafter, to the control circuits. The operation of the data circuits is under control of the control circuits, while the auxiliary circuits function independent of the control circuits. The auxiliary circuits are described in detail next.

Clock gates 2300 outputs timing signals on lines 2107 which define the time and the duration of the control stimuli supplied to the data circuits, peripheral 700 and register 200. The inputs to the clock gates 2300 are from crystal clock 302 on line 303 and from XF counter 304 on line 306. In connection with the timing signals, it is considered useful to define the following terms for use throughout the descriptions to follow.

A pulse is a signal with a positive going leading edge, a negative going trailing edge, and a duration equal to the duration of a clock signal from crystal clock 302. A gate is a signal with a positive leading edge and a negative trailing edge. The leading edge of the gate precedes the leading edge of the pulse by an amount sufficient for logic gate delays and data set-up times. The trailing edge of the gate trails the trailing edge of the pulse by an amount sufficient to provide for data-hold times. A signal is positive true and does not have a defined time duration or time relationship to a gate or a pulse. Clock 1 (Cl 1) is a gate and a clock 2 (Cl 2) is a pulse during Cl 1. Cl 1 and Cl 2 are disjunct with all other clocks. Clock 3 (Cl 3) is a gate following clock 1 and clock 4 (Cl 4) is a pulse during Cl 3. Cl 3 and Cl 4 are disjunct with all other clocks. Clock 5 (Cl 5) is a pulse following Cl 3. Clock 6 (Cl 6) is a pulse following Cl 5. Cl 6 is followed by Cl 1. Clock gates 2300 generate a continuous repetition of Cl 1 through Cl 6 on lines 2107. In general, Cl 1 and Cl 3 are used to control multiplexers that provide input data, which is subsequently pulsed in by Cl 2 and Cl 4 respectively. Cl 6 is used exclusively to operate the control circuits. During Cl 6, and only during Cl 6, the decisions regarding the next state of the process state register 2000, the substate counter 2200 and the condition register 2400 are made.

The second auxiliary circuit is the character position register 1900. Character position register 1900 is an eighteen bit register which is preset with the instantaneous value of counters XF 304, XC 309, YF 324 and YC 319 described previously. The preset occurs on the inverse of the clock that drives the counters, thereby copying the counter content in the character position register one half clock period after the counters of timer 300 are caused to count up. On signal 104 from sensor 400 the preset is stopped, thereby retaining the prior value of the counters in timer 300 for further processing by the digital computing means 1800.

Digital computing means 1800 accomplishes its objectives by means of control circuits, data circuits, and auxiliary circuits in nine data processing sequences, called process states. In the following description, each of the nine data processing sequences is described in detail with a description of each data circuit used in the data processing sequence and the control steps required. All data processing sequences are derived from control circuits comprising process state register 2000, substrate counter 2200, condition register 2400, and gates 2100. The control circuits are described in detail next.

Process state register 2000 is a four bit register in which ten states are coded. The state of the register is available on lines 2101. The next state of process register 2000 is determined by gates 2100 on Cl 6 and input to process state register 2000 on lines 2001. Each one of nine process states defines a major function of the digital computing means 1800, with one state being the halt state. The process states are: process state 0, the halt state of digital computing means in which no data processing takes place; process state 1, input one page of data from peripheral 700 into page memory 2700; process state 2, output one sentence of data from page memory 2700 to register 200; process state 3, place letterarea code in the character position pointed to by lightpen 600; process state 4, reposition letterarea code from a previous position to a new position representative of the current position of lightpen 600; process state 5, input data representative of the position of lightpen 600; process state 6, interpolate lightpen position data; process state 7, calculate the characteristic values of the handwritten trace; process state 8, compare stored characteristic values with calculated characteristic values and select the code representative of the symbol which offered the best comparison between stored and computed characteristic values; process state 9, output the contents of page memory 2700 to peripheral 700.

Substate counter 2200 is a five bit binary up/down counter with preset and reset. Within each process state the substate counter 2200 defines a sequence of substates required for data processing during the process state. The contents of substate counter 2200 are continuously available on lines 2102. The next state of substate counter 2200 is derived from input lines 2201.

Condition register 2400 is a five bit latch. Each of the latches in the register can be independently set or reset and are designated CR1, CR2, CR3, CR4 and CR5 respectively. These latches serve to retain a detected condition of the data circuits for use in subsequent data processing. The state of each latch is available on output 2103. Each latch can be set or reset by pulses on lines 2401.

Gates 2100 are responsive to external measurements, internal measurements and the states of process register 2000, substate counter 2200, condition register 2400 and clocks 2107. These gates issue stimuli to the data circuits, register 200 and peripheral 700 by means of Cl 1 through Cl 5, and in addition determine the next state of the registers 2000, 2200 and 2400 during Cl 6. The aforementioned external measurements consist of start, generated on line 2105; reset, generated on line 2106; data word available on line 2104; and data word have read on line 2111. The signals on 2104 and 2111 are generated by peripheral 700. Start and reset are operator initiated signals which respectively bring the digital computing means 1800 to process state 1 or 0. A signal on line 104 from sensor 400 brings the system to one of the four process states 3, 4, 5 or 6. A sentence output request on line 315 brings the digital computing means to process state 2.

Internal data measurements are inputs to gates 2100 on lines 2113 from the data circuits. The state of a data circuit is identified on one of lines 2113. By way of example, output 3101 of comparator 3100 is generated when the number on lines 3104 is identical to the number on lines 2803. The stimuli to the data circuits are generated on lines 2112. By way of example, one of the lines 2112 is input 3201 to character position counter 3200. A pulse on line 3201 causes the character counter position to count up. The stimuli to peripheral 700 are generated on lines 2108 and 2110. A gate generated on line 2108 is a data word request to peripheral 700. A gate on line 2110 announces the availability of a data word to peripheral 700.

The data processing during each of the ten process states is described in detail hereafter. This description comprises a statement of the objective to be attained during the process state under discussion, a detailed description of the data circuits used in each of the process states, and a detailed sequence of control actions required to accomplish the stated objective in the form of a state table, showing the process state (STATE), process substate (SUBSTATE), clock pulse number (CL), and the process operation or action (OPERATION). Stimuli are prefixed with "by", as in "write page memory 2700 by 2702", wherein a signal on line 2702 represents the stimulus.

Process state 0 is the halt state of digital computing means 1800. Process state 0 can be entered from any one of the other process states, either upon completion of the data processing or upon activation of the reset. If a reset signal 2106 occurs during Cl 6, the process state register 2000 will be set to 0, the substate state register 2200 will be set to 0, and the latches in the condition register 2400 will be reset. No processing occurs during this state.

| STATE | SUBSTATE | CL | OPERATION |
|---|---|---|---|
| 0 | 0 | 6 | Halt. If start signal 2105 present, set to state 1 substate 0. If sentence output request 315, set to state 2 substate 0. If lightpen 600 output 104 present and register 2400 CR1 not set, set to state 3 substate 0. If output 104 present, and CR1 is set and 3101 is not present, set to state 4 substate 0. If output 104 present, and CR1 is set and 3101 is present, set to state 5 substate 0. |

The objective of data processing during process state 1 is to read one page of data into page memory 2700 from peripheral 700. Process state 1 is entered from process state 0 upon the operator activating start signal 2105, or from process state 9 under conditions to be described. The data circuits used in data processing during process state 1 comprise selector 2500, page memory 2700, selector 2800, detector 3000, and address counter 2900. Selector 2500 is a five input by six bit multiplexer, which outputs one of three inputs or one of two codes on output lines 2701. A gate on line 2501 selects input 2510, representing a six bit alphanumeric code from lines 710, for output on lines 2701. A gate on line 2502 selects a six bit code representing the letterarea. A gate on line 2503 selects a six bit code representing a blank display symbol. A gate on line 2504 selects the contents of code register 4900. A gate on line 2505 selects the contents of character register 2600 for output on lines 2701.

Page memory 2700 is a 256 word by eight bit per word static random access memory. For each eight bit word, six bits are used to store a code representing an alpha numeric display symbol. A six bit output on lines 2601 representing the contents of the memory location addressed by the code on lines 2703 is continuously available except during a write cycle. The write cycle is initiated by a pulse on line 2702. During the write cycle the contents of the memory location addressed by lines 2703 is changed to represent the code on lines 2701. Selector 2800 is a two input by eight bit multiplexer. A gate on line 2801 selects input 3001 for output on lines 2703. A gate on line 2802 selects input 2803 for output on lines 2703. Address counter 2900 is an eight bit binary up counter with reset. The contents of the counter are continuously available on lines 3001. A pulse on line 2901 causes the counter to count up. A pulse on line 2902 resets the counter. Detector 3000 decodes the contents of address counter 2900. Whenever the contents of address counter 2900 are modulo 31 zero, a signal is generated on line 3003. Whenever the counter is modulo 255 zero, a signal is generated on line 3002. Character register 2600 is a six bit register used primarily to retain the code of the symbol displaced by the code for the letterarea in page memory 2700. The output of page memory 2700 is available on lines 2601. A pulse on line 2602 sets character register 2600 with the code on input lines 2601. The contents of register 2600 are continuously available on lines 2506.

| STATE | SUB-STATE | CL | OPERATION |
|---|---|---|---|
| 1 | 0 | 2 | Reset address counter 2900 by pulse on 2902. |
| 1 | 0 | 6 | Set to state 1 substate 1. |
| 1 | 1 | 1 | Word request to peripheral 700 by gate on 2108. |
| 1 | 1 | 6 | If word on 701 (indicated by signal on 2104) set to state 1 substate 2. |
| 1 | 2 | 1 | Select address counter 2900 output 3001 by 2801; select 2510 input by 2501. |
| 1 | 2 | 2 | Write page memory 2700 by 2702. |
| 1 | 2 | 4 | Up address counter 2900 by 2901. |
| 1 | 2 | 6 | If address detect 3002 present, set state to 0 and substate to 0; if address detect 3002 not present, set to state 1 substate 1. |

The objective of data processing during process state 2 is to output one sentence of data from page memory 2700 to register 200 for display on display 500. Process state 2 is entered from process state 0 upon the occurrence of a sentence output request on lines 315 generated by timer 300. The data circuits used in data processing during process state 2 are address counter 2900, selector 2800, and page memory 2700.

| STATE | SUB-STATE | CL | OPERATION |
|---|---|---|---|
| 2 | 0 | 1 | Select address counter 2900 output by 2801. |
| 2 | 0 | 2 | Read pulse to register 200 on 2603. |
| 2 | 0 | 4 | Up address counter 2900 by 2901. |
| 2 | 0 | 6 | If detector 3000 output 3003 true, set to state 0 substate 0. |

The objective of data processing during process state 3 is to place the letterarea code in a memory location of page memory 2700 in accordance with the position of lightpen 600 on display 500, under the condition that a letterarea was not previously defined. The data circuits used in the processing during process state 3 are character position register 1900, selector 2500, page memory 2700, selector 2800, character position counter 3200, and character register 2600.

Character position counter 3200 is an eight bit binary up/down counter with preset. The first five bits of this counter contain the XC number of a particular character position. The last three bits contain the YC number of the character position. A pulse on line 3203 presets the counter with the numbers on lines 3204. Lines 3204 are the subset of lines from character position register 1900 representing XC and YC. A pulse on line 3201 causes the counter to count up. A pulse on line 3202 causes the counter to count down. The eight bits in character position counter 3200 are continuously available on lines 2803. Process state 3 is entered from process state 0 upon a lightpen 600 output from sensor 400 if CR1 is not set, or from process state 4.

| STATE | SUB-STATE | CL | OPERATION |
|---|---|---|---|
| 3 | 0 | 2 | Set character position counter 3200 by 3203. |
| 3 | 0 | 6 | Set to state 3 substate 1. |
| 3 | 1 | 1 | Select character position counter 3200 output 2803 by 2802. |
| 3 | 1 | 2 | Set character register 2600 by 2602. |
| 3 | 1 | 3 | Select letterarea code by 2502; select character position output 2803 by 2802. |
| 3 | 1 | 4 | Write page memory 2700 by 2702. |
| 3 | 1 | 6 | Set to state 0 substate 0; set condition register 2400 CR1. |

Data processing during process state 4 determines whether lightpen 600 is positioned over the latterend 513, and if this is the case, enters process state 6 or alternatively, repositions the letterarea code to the position of lightpen 600. The data circuits used to accomplish the data processing during process state 4 are character position register 1900, character position counter 3200, selector 2500, character register 2600, page memory 2700, selector 2800, address counter 2900, and comparator 3100. Comparator 3100 compares the number on lines 2303 with the number on lines 3104, and provides an output signal on line 3101 when these numbers are equal. Process state 4 is entered from process state 0 upon a signal on line 104 from sensor 400, under condition that CR1 is set.

| STATE | SUB-STATE | CL | OPERATION |
|---|---|---|---|
| 4 | 0 | 2 | Up character position counter 3200 by 3201. |
| 4 | 0 | 6 | If comparator 3100 detects 2803 equal to 3104 by 3101, set to state 6; if 2803 not equal to 3104, set to state 4 substate 1. |
| 4 | 1 | 2 | Down character position counter 3200 by 3202. |
| 4 | 1 | 3 | Select character position counter 3200 output 2803 by 2802; select character register 2600 output 2506 by 2505. |
| 4 | 1 | 4 | Write page memory 2700 by 2702. |
| 4 | 1 | 5 | Set character position counter 3200 by 3203. |
| 4 | 1 | 6 | Set to state 3 subtate 1; reset condition register 2400 CR1. |

The objective of data processing during process state 5 is to input lightpen 600 position data into a last-in first-out (LIFO) memory under the condition that lightpen 600 is positioned over letterspace 512. The data circuits used in the data processing during process state 5 are character position register 1900, character position counter 3200, selector 2500, page memory 2700 and selector 2800, selector 3300, comparator 3300, comparator 3400, dot position register 3600, selector 3700, last-in first-out memory for X data 3800, last-in first-out memory for Y data 3900, interpolation coefficient counter for X data 4000, and interpolation coefficient counter for Y data 4100. Selector 3300 is a two input five bit multiplexer. A gate on line 3303 selects lines 3301, representing the value of XF counter 304. A gate on line 3304 selects lines 3302, representing the value of YF counter 314, for output on lines 3404. Magnitude comparator 3400 is a five bit comparator that compares the binary number on lines 3404 with the binary number on lines 3405. A pulse on line 3406 sets one of three outputs 3401, 3402 or 3403. A signal on line 3401 identifies that the binary number on lines 3404 is smaller than the binary number on lines 3405 at the time of pulse 3406. A signal on output 3402 identifies that the binary number on lines 3404 is equal to the binary number on lines 3405 at the time of pulse 3406. A signal on output 3403 will occur if the binary number on lines 3404 is larger than the binary number on lines 3405 at the time of pulse 3406.

Dot position register 3600 is a five bit binary up-/down counter with preset. A pulse on line 3603 will set the dot position register with the content of lines 3604. A pulse on line 3601 will increment the register by one. A pulse on line 3602 will decrement the register by one. The content of the register are continuously available on lines 3405. Selector 3700 is a three input by five bit multiplexer. A gate on line 3701 will cause output 3604 to reflect the input on lines 3706. A gate on line 3702 causes output lines 3604 to be logic "one". A gate on line 3703 causes output 3604 to reflect the input on line 3704.

Last-in first-out memory 3800 is a sixty-four word by six bits per word memory, in which up to sixty-four five bit XF values can be stored. The value last stored in the LIFO 3800 is continuously available on lines 3706. A pulse on line 3801 "pushes-in" a new value from input lines 3405. A pulse on line 3802 "pops-up" the value stored in sequence prior to the number on output lines 3706. When 64 values are stored in LIFO 3800 a signal is generated on line 3803, indicating the memory is full. Last-in first-out memory 3900 operates similarly to LIFO 3800, and is used to store YF values. The output is on lines 3704 and the input is on lines 3405. A pulse on line 3901 "pushes-in" a new value, while a pulse on line 3902 "pops-up" a prior value on output 3704. When sixty-four values are stored in LIFO 3900, a signal is generated on line 3903, indicating a memory full condition.

Interpolation coefficient counter X 4000 comprises a first and second three bit binary counter. The first counter is an up/down counter with reset. The first and second binary counters are connected in such a manner as to count up as if they form a six bit counter. A pulse on line 4002 resets the first counter. A pulse on line 4003 resets the second counter. A pulse on line 4001 presets the second binary counter with the contents of the first binary counter. A pulse on line 4005 causes the second binary counter to count down. A pulse on line 4004 causes the six bit binary counter formed by the first and the second counters to count up. The second counter forms the most significant bits of the six bit counter. An output will occur on line 4007 when the second binary counter is zero. Interpolation coefficient counter Y 4100 operates similarly to counter 4000. The first counter of 4100 is reset by a pulse on line 4102. The second counter of 4100 is reset by a pulse on line 4103, preset with the contents of the first counter by a pulse on line 4101, and caused to count down by a pulse on line 4105. The six bit counter is formed by the first and second counters and is caused to count up by a pulse on line 4104. An output will occur on line 4107 when the second binary counter is zero. Data processing during process state 5 is entered from process state 0 when lightpen 600 is positioned over the letterspace 512.

| STATE | SUB-STATE | CL | OPERATION |
|---|---|---|---|
| 5 | 0 | 1 | Select X LIFO 3800 output 3706 by 3701. |
| 5 | 0 | 2 | Set dot position register 3600 by 3603. |
| 5 | 0 | 3 | Select XF output 3301 by 3303. |
| 5 | 0 | 4 | Enable comparator 3400 by 3406. |
| 5 | 0 | 5 | Reset counter X 4000 by 4002 and 4003; reset counter Y 4100 by 4102 and 4103. |
| 5 | 0 | 6 | If 3404 equals 3405 rset 2400 CR2 and CR3, and set to state 5 substate 1; if 3404 less than 3405, set 2400 CR2, reset 2400 CR3, set to state 5 substate 1; if 3404 larger than 3405, reset 2400 CR2, set 2400 CR3, set to state 5 substate 1. |
| 5 | 1 | 1 | Select Y LIFO 3900 output 3704 by 3703. |
| 5 | 1 | 2 | Set dot position register 3600 by 3603. |
| 5 | 1 | 3 | Select VF counter 314, output 3302 by 3304. |
| 5 | 1 | 4 | Enable comparator 3400 by 3406. |
| 5 | 1 | 6 | If 3404 equals 3405 and 2400 CR2 reset and 2400 CR3 reset, set to state 0, substate 0; if 3404 equals 3405 and 2400 CR2 set or 2400 CR3 set, reset 2400 CR4, reset 2400 CR5, set to state 5 substate 5; if 3404 less than 3405 and 2400 CR2 reset and 2400 CR3 reset, set 2400 CR4, reset 2400 CR5, set to state 5 substate 2; if 3404 less than 3405 and 2400 CR2 set or 2400 CR3 set, set 2400 CR4, reset 2400 CR5, set to state 5 substate 3; if 3404 greater than 3405 and 2400 CR2 reset and 2400 CR3 reset, reset 2400 CR4, set 2400 CR5, set to state 5 substate 2; if 3404 greater than 3405 and 2400 CR2 set or 2400 CR3 set, reset 2400 CR4, set 2400 CR5, set to state 5 substate 3. |
| 5 | 2 | 1 | Select X LIFO 3800 output by 3706 by 3701. |
| 5 | 2 | 2 | Set dot position register 3600 by 3603. |
| 5 | 2 | 4 | Input 3405 to X LIFO 3800 by 3801; increment counter X 4000 by 1 by 4004. |
| 5 | 2 | 6 | If X LIFO 3800 full by 3803, set to state 5 substate 6, reset 2400 CR2, reset 2400 CR3, reset 2400 CR4, reset 2400 CR5; if X LIFO not full, set to state 5 substate 3. |
| 5 | 3 | 2 | If 2400 CR4 set, decrement register 3600 by 1 by 3602; if 2400 CR5 set, increment register 3600 by 1 by 3601. |
| 5 | 3 | 3 | Select YF counter 3302 by 3304. |
| 5 | 3 | 4 | Input 3405 to Y LIFO 3900 by 3901; increment counter Y 4100 by 1 by 4104; enable comparator 3400 by 3406. |
| 5 | 3 | 6 | If Y LIFO 3900 full 3903, set to state 5 substate 6, reset 2400 CR2, reset 2400 CR3, reset 2400 CR4, reset 2400 CR5; if Y LIFO 3900 not full and 3404 equal to 3405, set to state 5 substate 4; otherwise remain in state 5 substate 3. |
| 5 | 4 | 2 | If 2400 CR2 set, decrement register 3600 by 1 by 3602. If 2400 CR3 set increment register 3600 by 1 by 3601. |
| 5 | 4 | 3 | Select XF counter 3301 by 3303. |
| 5 | 4 | 4 | Input 3405 to X LIFO 3800 by 3801; increment counter X 4000 by 1 by 4004. Enable comparator 3400 by 3406. |
| 5 | 4 | 6 | If X LIFO 3800 full, set to state 5 substate 6, reset 2400 CR2, reset 2400 CR3, reset 2400 CR4, reset 2400 CR5. If X LIFO 3800 not full and 3404 equal to 3405, set to state 0 substate 0, otherwise remain in state 5 substate 4. |
| 5 | 5 | 1 | Select Y LIFO 3900 output 3704 by 3703. |
| 5 | 5 | 2 | Set dot position register 3600 by 3603. |
| 5 | 5 | 4 | INput 3405 to Y LIFO 3900 by 3901; increment counter Y 4100 by 1 by 4104. |
| 5 | 5 | 6 | If Y LIFO 3900 full 3903, set to state 5 substate 6, reset 2400 CR3, reset 2400 Cr4, reset 2400 CR5; if Y LIFO 3900 not full, set to state 5 sub state 4. |
| 5 | 6 | 3 | Select blank display symbol by 2503; select character position counter 3200 output 2803 by 2802. |
| 5 | 6 | 4 | Write page memory 2700 by 2702. |
| 5 | 6 | 6 | Set to state 0 substate 0; reset 2400 CR1. |

The objective of data processing during process state 6 is to interpolate the lightpen position data stored in LIFO 3900 and LIFO 3800 preparatory to the calculation of the characteristic values of the handwritten trace, made by lightpen 600. The data circuits used in the data processing during process state 6 are last-in first-out memory 3800, last-in first out memory 3900, selector 3700, dot position register 3600, interpolation coefficient counter 4000, interpolation coefficient counter 4100, and interpolation shift register 4200. Interpolation register 4200 is a seventeen word by five bits per word shift register, which can shift-in data from an external input or recirculate data internally. A pulse on line 4201 shifts data into the first word of the shift register from data input lines 3405. A pulse on line 4202 shifts the register and recirculates the last word in the register to the first word. The data in the last word of the register is continuously available on two five bit output lines, such that first lines 4306 and 4309 represent the actual data in the last word of the register and lines 4307 and 4308 represent the inverse of the data in the last word of the register. The condition of all ones on the ninth word or the seventeenth or last word of interpolation shift register 4200 will generate a signal on output 4203. Process state 6 is entered from process state 4, when lightpen 600 is positioned over letterend 513.

| STATE | SUB-STATE | CL | OPERATION |
|---|---|---|---|
| 6 | 0 | 1 | Select all ones output on 3604 by 3702. |
| 6 | 0 | 2 | Set dot position register 3600 by 3603. |
| 6 | 0 | 4 | Shift data input 3405 into register 4200 by 4201; reset first counter of counter X 4000 by 4002. |
| 6 | 0 | 6 | Set to state 6 substate 1. |
| 6 | 1 | 1 | Select X LIFO 3800 outpu 3706 by 3701. |
| 6 | 1 | 2 | Set dot position register 3600 by 3603. |
| 6 | 1 | 4 | Shift data input 3405 into register 4200 by 4201. |
| 6 | 1 | 5 | Pop-up X LIFO 3800 by 3802. |
| 6 | 1 | 6 | Set to state 6 substate 2. |
| 6 | 2 | 2 | Decrement second counter of counter X 4000 by 4005; increment counter X 4000 by 4004 |
| 6 | 2 | 5 | Pop-up X LIFO 3800 by 3802. |
| 6 | 2 | 6 | If the second counter of counter X 4000 is zero by 4007, set to state 6 substate 3, otherwise remain in state 6 substate 2. |
| 6 | 3 | 1 | Select X LIFO 3800 output 3706 by 3701. |
| 6 | 3 | 2 | Set dot position register 3600 by 3603. |
| 6 | 3 | 4 | Shift in data input 3405 to register 4200 by 4201; preset second counter of counter X 4000 with contents of first counter by 4001. |
| 6 | 3 | 5 | Pop-up X LIFO 3800 by 3802; reset first counter of counter X 4000 by 4002. |
| 6 | 3 | 6 | If register 4200 output all ones by 4203, set to state 6 substate 4; if register 4200 outpu not all ones, set to state 6 substate 2. |
| 6 | 4 | 1 | Select Y LIFO 3900 output 3704 by 3703. |
| 6 | 4 | 2 | Set dot position register 3600 by 3603. |
| 6 | 4 | 4 | Shift in data input 3405 to register 4200 by 4201, reset first counter of counter Y 4100a by 4102. |
| 6 | 4 | 5 | Pop-up Y LIFO 3900 by 3902. |
| 6 | 4 | 6 | Set to state 6 substate 5. |

-continued

| STATE | SUB-STATE | CL | OPERATION |
|---|---|---|---|
| 6 | 5 | 2 | Decrement second counter of counter Y 4100 by 4105; increment counter Y 4100 by 4104. |
| 6 | 5 | 5 | Pop-up Y LIFO 3900 by 3902. |
| 6 | 5 | 6 | If second counter of counter Y 4100 is zero by 4107, set to state 6 substate 6. |
| 6 | 6 | 1 | Select Y LIFO 3900 output 3704 by 3703. |
| 6 | 6 | 2 | Set dot position register 3600 by 3603. |
| 6 | 6 | 4 | Shift in data input 3405 to register 4200 by 4201; preset second counter of counter X 4000 with contents of first counter by 4001. |
| 6 | 6 | 5 | Pop-up Y LIFO 3900 by 3902; reset first counter of counter Y 4100 by 4102. |
| 6 | 6 | 6 | If register 4200 output all ones 4203, set to state 7 substate 0; if 4200 output not all ones, set to state 6 substate 5. |

The objective of data processing during process state 7 is to compute the characteristic values of the handwritten trace made by lightpen 600 with the equations defined by matrix MC as defined in equation 21 above. The data circuits used in data processing during process state 7 are interpolation shift register 4200, selector 4300, accumulator 4400 and H-register 4500. Selector 4300 is a four input by five bits per input multiplexer. A gate on line 4301 selects input on lines 4306 for output on lines 4401. The inputs on lines 4309 are connected to selector 4300 in such a manner as to shift the number on lines 4306 one bit position toward the least significant bit, with the most significant bit position connected so as to represent binary zero, so that if lines 4309 are selected the number on output 4401 is a truncated number one half of the number on output 4401 if input 4306 is selected. Line 4309 is selected by a gate on line 4304. The inputs on lines 4307 represent the inverse of lines 4306. A gate on line 4302 selects line 4307 for output on lines 4401. The inputs on lines 4308 are connected in such a manner to selector 4300 as to shift the number on lines 4307 one position to the least significant bit. This number is output on lines 4401 by a gate on line 4303. Accumulator 4400 contains a six bit register and a six bit adder. A pulse on line 4403 will set the register to a new number which is the sum of the number represented on lines 4401 and the number in the register. A pulse on line 4402 sets the register to the number zero. The contents of the register are continuously available on output lines 4501. H-register 4500 is a seven word by six bits per word shift register. A pulse on line 4502 will shift the register and place the contents of input lines 4501 in the first word of the register. A pulse on line 4504 will shift the register and place the contents of the last word in the first word of the register. A code of a logic zero in the sixth, most significant bit position and logic ones in all other bit positions in the last word of H-register 4500 generates an output on line 4503. Process state 7 is entered from process state 6 upon completion of the interpolation data processing.

| STATE | SUB-STATE | CL | OPERATION |
|---|---|---|---|
| 7 | 0 | 2 | Set accumulator 4400 register to zero by 4402. |
| 7 | 0 | 3 | Select register 4200 output 4306 by 4301. |
| 7 | 0 | 4 | Add accumulator 4400 by 4403. |
| 7 | 0 | 5 | Shift 4501 in register 4500 by 4502; shift and recirculate data in register 4200 by 4202. |
| 7 | 0 | 6 | Set to state 7 substate 1. |
| 7 | 1 | 2 | Set accumulator 4400 register to zero by 4402. |
| 7 | 1 | 4 | Shift and recirculate data in register 4200 by 4202. |
| 7 | 1 | 6 | Set to state 7 substate 2. |
| 7 | 2 | 1 | Select register 4200 output 4306 by 4301. |
| 7 | 2 | 2 | Add accumulator 4400 by 4403. |
| 7 | 2 | 4 | Shift and recirculate data in register 4200 by 4202. |
| 7 | 2 | 5 | Shift and recirculate data in register 4200 by 4202. |
| 7 | 2 | 6 | Set to state 7 substate 3. |
| 7 | 3 | 1 | Select register 4200 output 4307 by 4302. |
| 7 | 3 | 2 | Add accumulator 4400 by 4403. |
| 7 | 3 | 4 | Shift and recirculate data in register 4200 by 4202. |
| 7 | 3 | 6 | Set to state 7 substate 4. |
| 7 | 4 | 1 | Select register 4200 output 4307 by 4302. |
| 7 | 4 | 2 | Add accumulator 4400 by 4403. |
| 7 | 4 | 3 | Select register 4200 output 4308 by 4303 |
| 7 | 4 | 4 | Add accumulator 4400 by 4403 |
| 7 | 4 | 5 | Shift and recirculate data in register 4200 by 4202. |
| 7 | 4 | 6 | Set to state 7 substate 5. |
| 7 | 5 | 1 | Select register 4200 output 4307 by 4302. |
| 7 | 5 | 2 | Add accumulator 4400 by 4403. |
| 7 | 5 | 4 | Shift and recirculate data in register 4200 by 4202. |
| 7 | 5 | 5 | Shift and recirculate data in register 4200 by 4202. |
| 7 | 5 | 6 | Set to state 7 substate 6. |
| 7 | 6 | 1 | Select register 4200 output 4306 by 4301. |
| 7 | 6 | 2 | Add accumulator 4400 by 4403. |
| 7 | 6 | 5 | Shift and recirculate data in register 4200 by 4202. |
| 7 | 6 | 6 | Set to state 7 substate 7. |
| 7 | 7 | 1 | Select register 4200 output 4306 by 4301. |
| 7 | 7 | 2 | Add accumulator 4400 by 4403. |
| 7 | 7 | 3 | Select register 4200 output 4309 by 4304. |
| 7 | 7 | 4 | Add accumulator 4400 by 4403. |
| 7 | 7 | 5 | Shift and recirculate data in register 4200 by 4202; shift in register 4500 by 4502. |
| 7 | 7 | 6 | If 2400 CR2 reset, set 2400 CR2 and set to state 7 substate 1; if 2400 CR2 set, reset 2400 CR2 and set to state 7 substate 8. |
| 7 | 8 | 2 | Set accumulator 4400 register to zero by 4402. |
| 7 | 8 | 5 | Shift and recirculate data in register 4200 by 4202. |
| 7 | 8 | 6 | Set to state 7 substate 9. |
| 7 | 9 | 1 | Select register 4200 output 4307 by 4302. |
| 7 | 9 | 2 | Add accumulator 4400 by 4403. |
| 7 | 9 | 4 | Shift and recirculate data in register 4200 by 4202. |
| 7 | 9 | 5 | Shift and recirculate data in register 4200 by 4202. |
| 7 | 9 | 6 | Set to state 7 substate 10. |
| 7 | 10 | 1 | Select register 4200 output 4306 by 4301. |
| 7 | 10 | 2 | Add accumulator 4400 by 4403. |
| 7 | 10 | 4 | Shift and recirculate data in register 4200 by 4202. |
| 7 | 10 | 5 | Shift and recirculate data in register 4200 by 4202. |
| 7 | 10 | 6 | Set to state 7 substate 11. |
| 7 | 11 | 1 | Select register 4200 output 4307 by 4302. |
| 7 | 11 | 2 | Add accumulator 4400 by 4403. |
| 7 | 11 | 4 | Shift and recirculate data in register 4200 by 4202. |
| 7 | 11 | 5 | Shift and recirculate data in register 4200 by 4202. |
| 7 | 11 | 6 | Set to state 7 substate 12. |
| 7 | 12 | 1 | Select register 4200 output 4306 by 4301. |
| 7 | 12 | 2 | Add accumulator 4400 by 4403. |
| 7 | 12 | 5 | Shift and recirculate data in register 4200 by 4202; shift in register 4500 by 4502. |

-continued

| STATE | SUB-STATE | CL | OPERATION |
|---|---|---|---|
| 7 | 12 | 6 | If register 2400 CR2 reset, set 2400 CR2 and set to state 7 substate 13; if register 2400 CR2 set, reset 2400 CR2 and set to state 7 substate 14. |
| 7 | 13 | 2 | Set accumulator 4400 register to zero by 4402. |
| 7 | 13 | 6 | Set to state 7 substate 9. |
| 7 | 14 | 1 | Select register 4200 output 4306 by 4301. |
| 7 | 14 | 2 | Add accumulator 4400 by 4403. |
| 7 | 14 | 5 | Shift and recirculate data in register 4200 by 4202. |
| 7 | 14 | 6 | Set to state 7 substate 15. |
| 7 | 15 | 1 | Select register 4200 output 4306 by 4301. |
| 7 | 15 | 2 | Add accumulator 4400 by 4403. |
| 7 | 15 | 3 | Select register 4200 output 4309 by 4304. |
| 7 | 15 | 4 | Add accumulator 4400 by 4403. |
| 7 | 15 | 5 | Shift and recirculate data in register 4200 by 4202. |
| 7 | 15 | 6 | Set to state 7 substate 16. |
| 7 | 16 | 1 | Select register 4200 output 4306 by 4301. |
| 7 | 16 | 2 | Add accumulator 4400 by 4403. |
| 7 | 16 | 4 | Shift and recirculate data in register 4200 by 4202. |
| 7 | 16 | 5 | Shift and recirculate data in register 4200 by 4202. |
| 7 | 16 | 6 | Set to state 7 substate 17. |
| 7 | 17 | 1 | Select register 4200 output 4307 by 4302. |
| 7 | 17 | 2 | Add accumulator 4400 by 4403. |
| 7 | 17 | 5 | Shift and recirculate data in register 4200 by 4202. |
| 7 | 17 | 6 | Set to state 7 substate 18. |
| 7 | 18 | 1 | Select register 4200 output 4307 by 4302. |
| 7 | 18 | 2 | Add accumulator 4400 by 4403. |
| 7 | 18 | 3 | Select register 4200 output 4307 by 4303. |
| 7 | 18 | 4 | Add accumulator 4400 by 4403. |
| 7 | 18 | 5 | Shift and recirculate data in register 4200 by 4202. |
| 7 | 18 | 6 | Set to state 7 substate 19. |
| 7 | 19 | 1 | Select register 4200 output 4307 by 4302. |
| 7 | 19 | 2 | Add accumulator 4400 by 4403. |
| 7 | 19 | 4 | Shift and recirculate data in register 4200 by 4202. |
| 7 | 19 | 5 | Shift and recirculate data in register 4200 by 4202; shift in register 4500 by 4502. |
| 7 | 19 | 6 | If register 2400 CR2 reset, set 2400 CR2 and set to state 7 substate 20; if register 2400 CR2 set, reset 2400 CR2 and set to state 8 substate 0 |
| 7 | 20 | 2 | Set accumulator 4400 register to zero by 4402. |
| 7 | 20 | 6 | Set to state 7 substate 14. |

The objective of data processing during process state 8 is to select the USASCII code of the symbol most closely resembling the trace made by lightpen 600 on letterspace 512. The data circuits used in data processing during process state 8 are register 4500, selector 2500, character position counter 3200, selector 2800, page memory 2700, difference accumulator 4600, difference register 4800, comparator 4700, read only memory (ROM) 5100, address counter 5200, address detector 5300, code register 4900, and code detector 5000. Difference accumulator 4600 contains a seven bit register, an eight bit accumulator register, and an eight bit adder. A pulse on line 4603 sets the sum of the number of input lines 4604 and the number on input lines 4601 in the seven bit register. A pulse on line 4605 sets the sum of the number in the eight bit accumulator and the number in the seven bit register in the eight bit accumulator register. A pulse on line 4602 resets the eight bit accumulator register to the number zero. The number in the eight bit accumulator is continuously available on output lines 4701. Difference register 4800 is an eight bit register. The contents of the register are continuously available on output lines 4702. A pulse on line 4803 presets the register with the number on input lines 4701. A pulse on line 4802 presets the register to all ones. Comparator 4700 compares the number on lines 4701 with the number on lines 4702. If the number on lines 4701 is smaller than the number on lines 4702, a signal is generated on line 4703.

Read only memory 5100 is a 2048 bit static read only memory organized in 256 word by eight bits per word. Of the 256 available words, 252 words are used, and of the eight bits available per word six bits are used to represent the characteristic values of each of the traces the system is able to recognize. These traces are 26 alphabetic symbols, eight numeric symbols and two control symbols. The numeric symbols zero and one are the same as the alphabetic characters "O" and "I". The control symbols are "Page" and "Final". Upon the detection of the control symbol Page, the digital computing means 1800 will transmit the contents of page memory 2700 to peripheral 700 and thereafter request a new page of data from peripheral 700. Upon detection of the control symbol Final, the digital computing means 1800 will output the contents of page memory 2700 to peripheral 700 and enter process state 0 to wait for a state input on line 2105. The format for storage in ROM 5100 of the characteristic values of each symbol is as follows. Each symbol requires seven ROM locations organized identically to the seven words in the H-register 4500, with the exception that where the last word in the H-register is a stop code, the seventh word in the set of seven words for each symbol is the USASCII code for the symbol associated with the six characteristic values in the preceding six ROM address locations. When an eight bit address is presented on lines 5101 the content of the address location is available on output lines 4604.

Address counter 5200 is an eight bit binary up counter with reset. A pulse on line 5202 will reset the counter. A pulse on line 5201 will cause the counter to count up. The counter state is continuously available on lines 5101, serving as the address input to ROM 5100. Address detect 5300 provides a signal on line 5301 whenever the output of counter 5200 is 251, the address of the last data location in ROM 5100. Code register 4900 is a six bit register used to store the six bit code of the symbol. A pulse on line 4901 sets the register to the date on input 4604. The register contents are available on output lines 2507. Control symbol detector 5000 detects the control symbols Page and Final. Whenever code register 4900 contains the code for Page, a signal on output line 5001 is generated. Whenever the register 4900 contains the code for Final, a signal on output 5002 is generated. Process state 8 is entered from process state 7 upon completion of the computation of the characteristic values of the trace made by lightpen 600.

| STATE | SUB-STATE | CL | OPERATION |
|---|---|---|---|
| 8 | 0 | 2 | Reset counter 5200 by 5202; reset difference accumulator 4600 by 4602. |
| 8 | 0 | 4 | Preset difference register 4800 to all ones by 4802; recirculate register 4500 by 4504. |
| 8 | 0 | 6 | Set to state 8 substate 1. |
| 8 | 1 | 2 | Sum lines 4601 and 4604 and store in register of 4600 by 4603. |
| 8 | 1 | 4 | Increment counter 5200 by 5201; recirculate register 4500 by 4504. |
| 8 | 1 | 5 | Sum contents of register and accumulator |

-continued

| STATE | SUB-STATE | CL | OPERATION |
|---|---|---|---|
| | | | and store in accumulator of 4600 by 4605. |
| 8 | 1 | 6 | If last word of register 4500 is thirty-one by 4503 and 4701 is less than 4702 by 4703, set to state 8 substate 3; if last word of register 4500 is thirty-one by 4503 and 4701 is not less than 4702, set to state 8 substate 2, otherwise remain in state 8 substate 1. |
| 8 | 2 | 2 | Reset accumulator of 4600 by 4602. |
| 8 | 2 | 4 | Recirculate register 4500 by 4504; increment counter 5200 by 5201. |
| 8 | 2 | 6 | If maximum address count by 5301, set to state 8 substate 4; if not maximum address count, set to state 8 substate 1. |
| 8 | 3 | 2 | Set register 4900 equal to ROM 5100 output 4604 by 4901; preset register 4800 to accumulator output 4701 by 4803. |
| 8 | 3 | 4 | Recirculate register 4500 by 4504; increment counter 5200 by 5201. |
| 8 | 3 | 5 | Reset accumulator of 4600 by 4602. |
| 8 | 3 | 6 | If maximum ROM 5100 address by 5301, set to state 8 substate 4; if not maximum ROM 5100 address by 5301, set to state 8 substate 1. |
| 8 | 4 | 6 | If Page code detect by 5001 set register 2400 CR2, reset register 2400 CR3, set to state 8 substate 6; if Final code detect by 5002, reset register 2400 CR2, set register 2400 CR3, set to state 8 substate 6; if neither Page code detect by 5001 nor Final code detect by 5002, set to state 8 substate 5. |
| 8 | 5 | 1 | Select code register 4900 output 2507 by 2504; select character position counter output 2803 by 2802. |
| 8 | 5 | 2 | Write page memory 2700 by 2702. |
| 8 | 5 | 5 | Increment counter 3200 by 3201. |
| 8 | 5 | 6 | Reset register 2400 CR1; set to state 3 substate 1. |
| 8 | 6 | 1 | Select register 2600 output 2506 by 2505; select character position counter output 2803 by 2802. |
| 8 | 6 | 2 | Write page memory 2700 by 2702. |
| 8 | 6 | 6 | Reset register 2400 CR1; set to state 9 substate 0. |

The objective of data processing in process state 9 is to output the contents of page memory 2700 to peripheral 700. The data circuits used during data processing in process state 9 are address counter 2900, selector 2800, page memory 2700, detector 3000, and character register 2600, the operation of which have previously been described. Process state 9 is entered from process state 8 upon detection of a control code by 5001 or 5002 from detector 5000.

| STATE | SUB-STATE | CL | OPERATION |
|---|---|---|---|
| 9 | 0 | 2 | Reset counter 2900 by 2902. |
| 9 | 0 | 6 | Set to state 9 substate 1. |
| 9 | 1 | 1 | Select counter 2900 output 3001 by 2801. |
| 9 | 1 | 2 | Preset register 2600 by 2602. |
| 9 | 1 | 4 | Input data word available 2110 to peripheral 700; increment counter 2900 by 2901. |
| 9 | 1 | 6 | Set to state 9 substate 2. |
| 9 | 2 | 6 | If word read 2111 present and detector 3000 output 3002 not present, set to state 9 substate 1; if word read 2111 present and detector 3000 output 3002 present and register 2400 CR2 set, reset register 2400 CR2 and set to state 1 substate 0; if word read 2111 present and detector 3000 output 3002 present and register 2400 CR3 is set, reset register 2400 CR3 and set to |

-continued

| STATE | SUB-STATE | CL | OPERATION |
|---|---|---|---|
| | | | process state 0 substate 0. |

The methods of analysis and design of the various instructional sequences implementing the individual functions discussed herein are well known by those skilled in the art. In this respect, other variations may occur to those skilled in the relevant arts in light of the teachings of the present invention and such variations or modifications may be made in the invention without departing from the spirit of it.

The embodiments of the invention in which an exclusive property or privilege is claimed are defined as follows:

1. An interactive optical data entry and display system for decoding a handwritten trace into a data processing code defined by a set of predetermined symbols, said system comprising:
   (a) a control means for generating a signal sequence;
   (b) a display responsive to said signal seequence for displaying a corresponding pattern of display elements;
   (c) tracing means for making said handwritten trace on said display;
   (d) sensing means in association with said control means and said tracing means for identifying, in terms of a first coordinate and a second coordinate, the positions of those display elements passed over by said tracing means while making said handwritten trace; and
   (e) computing means responsive to said sensing means and said control means comprising:
   i. for each of said predetermined symbols, a stored trace uniquely corresponding thereto;
   ii. means for comparing said handwritten trace with each of said stored traces such that the best comparison identifies said written trace as the symbol corresponding to the stored trace which caused said best comparison;
   iii. means for tabulating a first ordered list of values corresponding to those of said first coordinates identified by said handwritten trace and a second ordered list of values corresponding to those of said second coordinates identified by said handwritten trace;
   iv. a plurality of matrices; and
   v. calculating means for multiplying one of said matrices with said first ordered list to derive a first vector and for multiplying one of said matrices with said second ordered list to derive a second vector.

2. A system according to claim 1, wherein said control means comprises a timing circuit and a plurality of registers and wherein said display is responsive to said timing circuit such that each of said display elements is uniquely defined by a particular state of said timing circuit.

3. A system according to claim 2 wherein said display is responsive to said plurality of registers such that the display image produced by said display is defined by the contents of said plurality of registers and wherein said tracing means comprises a lightpen responsive to said display elements and said sensing means comprises a sensing circuit adapted to generate an output in response to inputs from said lightpen.

4. A system according to claim 3, wherein said computing means includes means responsive to said timing circuit and to said output of said sensing circuit wherein the states of said timing circuit corresponding to the generation of said output of said sensing circuit define a first series of values descriptive of said handwritten trace on said display.

5. A system according to claim 4, wherein each of said stored traces comprises a series of stored characteristic values uniquely identifying a corresponding one of said predetermined symbols and wherein said computing means includes means for comparing said first series of values with each of said series of stored characteristic values such that the best value comparison identifies said handwritten trace as that symbol corresponding to the series of stored characteristic values causing said best value comparison.

6. A system according to claim 1, wherein said computing means includes interpolation means for interpolating said first and second ordered lists such that their lengths are equal and wherein said plurality of matrices comprisees a simple matrix having a dimension compatible with said length of said first and second ordered lists.

7. A system according to claim 6, wherein said single matric comprises numbers such that when said single matrix is multiplied with the sampled values of a periodic function the coefficients of the Fourier Series expansion of said periodic function results.

8. A system according to claim 7, wherein said interpolation means includes means for interpolating said first and second lists such that their length is eight and wherein said single matrix is

| 1.5 | 1  | 0    | −1 | −1.5 | −1 | 0    | 1 |
|-----|----|------|----|------|----|------|---|
| 1   | 0  | −1   | 0  | 1    | 0  | −1   | 0 |
| 0   | −1 | −1.5 | −1 | 0    | 1  | 1.5  | 1 |

9. A system according to claim 1, wherein said computing means includes, for each of said stored traces, a third vector with a dimension equal to the sum of the dimensions of said first and second vectors and wherein each of said third vectors uniquely identifies one of said stored traces, said computing means including means for comparing the component terms of said first and second vectors with respective terms of each of said third vectors such that the best vector comparison identifies said handwritten trace as the symbol corresponding to the third vector which caused said best vector comparison.

10. A system according to claim 9, wherein each of said third vectors comprises the coefficients of a Fourier series expansion derived from the trace of the predetermined symbol corresponding thereto.

11. A method for identifying a handwritten trace entered on a display comprising the steps of:
(a) displaying a pattern of display elements on a display;
(b) entering a handwritten trace on said display so as to identify the positions of some at least of said display elements in terms of a first coordinate and a second coordinate;
(c) tabulating a first ordered list comprising said first coordinates and a second ordered list comprising said second coordinates;
(d) interpolating said first and second ordered lists such that their lengths are equal;
(e) multiplying a matrix with said interpolated first and second ordered lists to derive respectively a first vector and a second vector;
(f) comparing said vectors with each of a series of stored vectors uniquely corresponding to one of said predetermined symbols; and
(g) identifying said handwritten trace as the symbol corresponding to the stored vector which caused the best of said comparisons.

12. A method according to claim 11, wherein said comparison step comprises the step of comparing the component terms of said first and second vectors with the respective terms of each of a series of third vectors, each of said third vectors comprising the coefficients of a Fourier Series expansion derived from said first and second coordinates of one of said predetermined symbols.

13. A method according to claim 12, wherein said identification step comprises the step of identifying the best comparision of said first and second vectors with each of said third vectors as the symbol corresponding to the third vector which caused said best comparison.

14. An interactive optical data entry and display system for decoding a handwritten trace into a data processing code defined by a set of predetermined symbols, said system comprising:
(a) a display having an effectively continuous display screen comprised of a plurality of selectively visually sensible display elements and operative to visually display any one or more of said set of predetermined symbols anywhere on said screen by patterns of said display elements;
(b) control means connected to said display for generating on said screen a pattern of visually sensible display elements forming a letterarea, said letterarea having a first pattern of visually sensible display elements forming a letterspace and a second pattern of visually sensible display elements forming a letterend;
(c) tracing means for making a handwritten trace on said display screen within said letterarea;
(d) sensing means in association with said control means and said tracing means for identifying each of said display elements of said letterspace and at least one of said display elements of said letterend passed over by said tracing means while making said handwritten trace; and
(e) computing means responsive to said sensing means and said control means and having, for each of said predetermined symbols, a stored trace uniquely corresponding thereto, said computing means including means for comparing said identified display elements of said letterspace with each of said stored traces such that the best comparison identifies a handwritten trace as the symbol corresponding to the stored trace which caused said best comparison.

15. A system according to claim 14, wherein said computing means includes additional means for selecting signal sequences for generation by said control means such that the display is caused to exhibit the symbol corresponding to said stored trace causing said best comparison.

16. A system according to claim 15, wherein said additional means includes means for selecting said signal sequence such that the corresponding pattern of display elements is caused to exhibit the symbol corresponding to said stored trace causing said best comparison only after said tracing means has passed over at least one display element of said the letterend.

17. A system according to claim 14, wherein said control means comprises means responsive to said sensing means and said sensing means includes means for selecting signal sequences for generation by said control means such that the letterspace continuously reflects said handwritten trace in progress.

18. The interactive optical data entry and display system according to claim 14 wherein said control means is operative in response to said best comparison to generate on said screen a pattern of visually sensible display elements forming the symbol corresponding to the stored trace which caused said best comparison.

19. The interactive optical data entry and display system according to claim 18 wherein said control means are operative in response to said tracing means to generate on said screen in said letterspace a pattern of visually sensible display elements corresponding to said handwritten trace.

20. A method for entering, displaying, comparing and identifying handwritten traces defined by a set of predetermined symbols comprising the steps of:
(a) causing a display screen to visually display on said screen a pattern of selectively visually sensible elements forming a letterarea, said letterarea including a first pattern of visually sensible display elements forming a letterspace and a second pattern of visually sensible display elements forming a letterend;
(c) entering on said screen and within said letterspace a desired handwritten trace;
(c) causing said letterspace to continuously reflect the in-progress condition of said desired handwritten trace;
(d) entering on said screen and within at least one of said elements of said letterend a handwritten trace completing said desired handwritten trace within said letterspace;
(e) comparing said desired completed entered handwritten trace within said letterspace with each of a series of stored traces uniquely corresponding to one of said predetermined symbols;
(f) identifying said desired completed entered handwritten trace within said letterspace as the symbol corresponding to the stored trace which caused the best of said comparisons; and
(g) causing display in the letterspace of said screen of the predetermined symbol corresponding to said stored trace causing said best comparison.

* * * * *